United States Patent [19]

Harms et al.

[11] Patent Number: 4,622,396

[45] Date of Patent: Nov. 11, 1986

[54] TRIPHENDIOXAZINE DYESTUFFS

[75] Inventors: Wolfgang Harms; Klaus Wunderlich; Horst Jäger, all of Leverkusen, Fed. Rep. of Germany

[73] Assignee: Bayer Aktiengesellschaft, Leverkusen, Fed. Rep. of Germany

[21] Appl. No.: 704,441

[22] Filed: Feb. 22, 1985

[30] Foreign Application Priority Data

Mar. 15, 1984 [DE] Fed. Rep. of Germany ....... 3409439

[51] Int. Cl.[4] ............................................ C07D 265/28

[52] U.S. Cl. ........................................... 544/76; 544/75

[58] Field of Search .................................... 544/75, 76

[56] References Cited

U.S. PATENT DOCUMENTS

| | | | |
|---|---|---|---|
| 2,355,497 | 8/1944 | Zwilgmeyer et al. | 544/76 |
| 3,996,221 | 12/1976 | Leng et al. | 544/75 X |
| 4,092,478 | 5/1978 | Plant et al. | 544/76 |
| 4,336,377 | 6/1982 | Adam et al. | 544/74 |
| 4,440,504 | 8/1982 | Harms et al. | 544/76 |
| 4,472,575 | 9/1984 | Renfrew | 544/76 |

FOREIGN PATENT DOCUMENTS

| | | |
|---|---|---|
| 0015232 | 9/1980 | European Pat. Off. . |
| 0053743 | 6/1982 | European Pat. Off. . |

*Primary Examiner*—Richard L. Raymond
*Attorney, Agent, or Firm*—Sprung Horn Kramer & Woods

[57] ABSTRACT

The present invention relates to dyestuffs of the formula

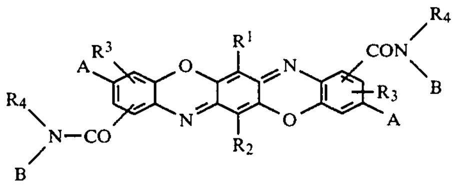

(I)

wherein

A = a substituent,

B = H or a substituent, with the proviso that at least one of these substituents contains a fibre-reactive group, and $R_1$-$R_4$ = H or a substituent.

Preferred dyestuffs I are those which contain at least two groups which confer water-solubility, in particular sulpho, sulphato or carboxyl groups.

12 Claims, No Drawings

TRIPHENDIOXAZINE DYESTUFFS

The present invention relates to dyestuffs of the formula

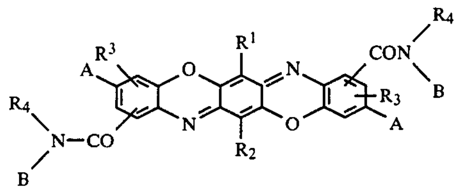

(I)

wherein

A=a substituent,

B=H or a substituent, with the proviso that at least one of these substituents contains a fibrereactive group, and $R_1$-$R_4$=H or a substituent.

Preferred dyestuffs I are those which contain at least two groups which confer water-solubility, in particular sulpho, sulphato or carboxyl groups.

Examples of suitable substituents A are those of the formula

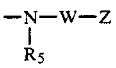

(II)

wherein

W=direct bond or

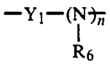

wherein n+0 or 1, $Y_1$=a bridge member and

Z=a fibre-reactive group, or those of the formula

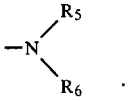

(III)

wherein $R_5$=H or optionally substituted $C_1$-$C_6$-alkyl and $R_6$=H, optionally substituted $C_1$-$C_6$-alkyl, $C_5$-$C_6$-cycloalkyl, optionally substituted phenyl-$C_1$-$C_4$-alkyl, optionally substituted aryl, preferably optionally substituted phenyl or naphthyl, or optionally substituted $C_1$-$C_4$-alkyl-, phenyl-$C_1$-$C_4$-alkyl, phenyl- or naphthyl- sulphonyl, or wherein $R_5$ ad $R_6$ together can also denote a $C_4$-$C_5$-alkylene radical which is optionally interrupted by O or N.

Particularly suitable substituents for the alkyl radicals $R_5$ and $R_6$ are: groups which confer water-solubility or hydrophilic groups, such as: $-SO_3H$, $-OSO_3H$, $-COOH$, $-OH$ or $C_1$-$C_4$-alkoxy, optionally substituted, for example, by $C_1$-$C_4$-hydroxyalkyl or $C_1$-$C_4$-alkoxy-$C_1$-$C_4$-alkyl.

Examples of possible substituents for the aryl radicals, in particular the phenyl radicals, are: $-SO_3H$, $-COOH$ and furthermore $C_1$-$C_{14}$-alkyl, halogen, $C_1$-$C_4$-alkoxy and functionally modified sulpho and carboxyl groups.

Examples of bridge members $Y_1$ are alkylene radicals, such as $C_2$-$C_6$-alkylene, optionally interrupted by O, S or N and optionally substituted, for example ethylene, 1,2- and 1,3-propylene, 1,2-, 1,3-, 1,4- and 2,3-butylene, 2-methyl-1,3-propylene, 2,2-dimethylpropylene, 2-methyl-2,4-pentylene, 1-phenylethylene, 2,5-hexylene, 1,5-pentylene, 1,6-hexylene, 1,3-cyclohexylene, 1,4-cyclohexylene, 4-methyl-1,3-cyclohexylene, 2-hydroxy-1,3-propylene, 2-sulphato-1,3-propylene, $-CH_2CH_2-O-CH_2CH_2-$, $-CH_2CH_2-S-CH_2CH_2-$,

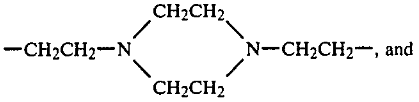

and

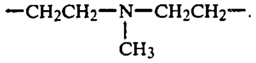

alkylene radicals such as

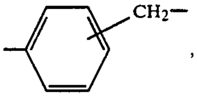
,
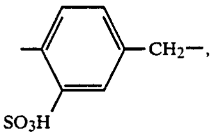

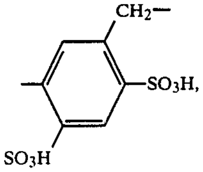
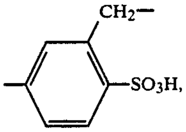
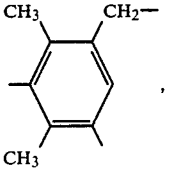

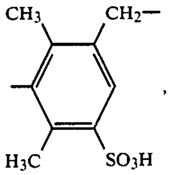
,
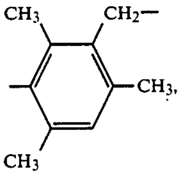

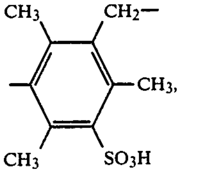

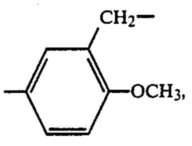
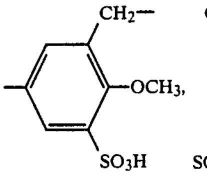
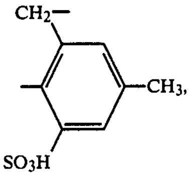

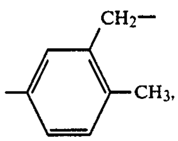
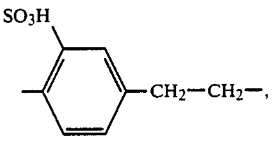

-continued

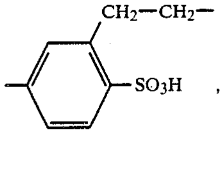
,
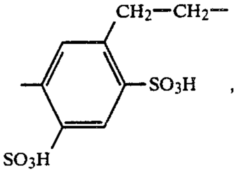
,

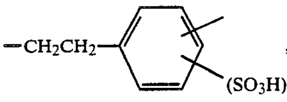
,
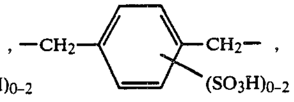
,

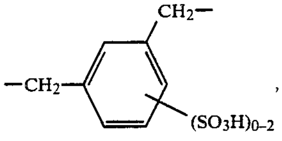
,
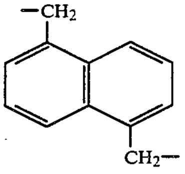

and the radical

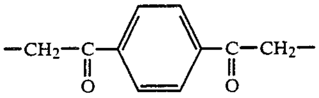

arylene radicals, such as optionally substituted phenylene, in particular phenylene and phenylene which is substituted by alkyl, alkoxy, sulpho, carboxyl or halogen, such as 1,2-, 1,3- and 1,4-phenylene, 3-methyl-1,2-phenylene, 4-methyl-1,2-phenylene, 2-methyl-1,3-phenylene, 4-methyl-1,3-phenylene, 5-methyl-1,3-phenylene, 2-methyl-1,4-phenylene, 2,4,6-trimethyl-1,3-phenylene, 2,3,5,6-tetramethyl-1,4-phenylene, 2,6-dimethyl-1,3-phenylene, 2-methyl-6-ethyl-1,3-phenylene, 2-methyl-4,6-diethyl-1,3-phenylene, 2,6-diethyl-4-methyl-1,3-phenylene, 2-methoxy-1,3-phenylene, 4-methoxy-1,3-phenylene, 6-methoxy-1,3-phenylene, 2-methoxy-1,4-phenylene, 4-chloro-1,3-phenylene, 2-chloro-1,4-phenylene, 4-chloro-1,3-phenylene and 2-chloro-1,4-phenylene, and, in particular, the arylene radicals mentioned, substituted by 1-2 sulphonic acid groups, such as, for example, 4-sulpho-1,2-phenylene, 4-sulpho-1,3-phenylene, 3-sulpho-1,4-phenylene, 2-sulpho-1,4-phenylene, 4,6-disulpho-1,3-phenylene, 2,5-disulpho-1,4-phenylene, 2-methyl-5-sulpho-1,3-phenylene, 2-methyl-4-sulpho-1,3-phenylene, 2,4,6-trimethyl-5-sulpho-1,3-phenylene, 2,6-dimethyl-4- and -5-sulpho-1,3-phenylene, 2-methyl-6-sulpho-1,3-phenylene, 4-methyl-6-sulpho-1,3-phenylene, 6-methyl-4-sulpho-1,3-phenylene, 3-methyl-6-sulpho-1,4-phenylene, 6-methoxy-4-sulpho-1,3-phenylene and 4-methoxy-6-sulpho-1,3-phenylene.

Examples of suitable radicals B are those of the formula

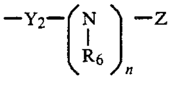 (IV)

or the radical $$R_6 \quad \text{(Iva)}$$

wherein $Y_2$ = a bridge member and n = 0 or 1.

Suitable bridge members $Y_2$ are those mentioned for $Y_1$, and, if n = 1, those of the formula $$-SO_2\text{—arylene—}$$

especially those where arylene = optionally substituted phenylene or $R_6$.

Examples of suitable radicals $R_1$ and $R_2$ are Cl, Br, $C_1$-$C_4$-alkyl, $C_1$-$C_4$-alkoxy, aryloxy, in particular optionally substituted phenoxy, acylamino, carboxyl and optionally further substituted carboxamide.

Examples of suitable radicals $R_3$ are $C_1$–$C_4$-alkyl, $C_1$-$C_4$-alkoxy and halogen, in particular Cl.

Suitable radicals $R_4$ are the radicals $R_6$.

Preferred dyestuffs are quite generally those in which the radicals A, but not the radicals B, contain a reactive group, and furthermore those in which the radicals B contain a reactive group, and not the radicals A.

The radicals

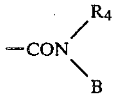

are preferably in the o-position relative to A.

Preferably, $R_1$ and $R_2$represent Cl and $R_3$ represents H.

Examples of suitable of fibre-reactive radicals Z, that is to say those which react with materials containing hydroxyl groups or amide groups under dyeing conditions to from a covalent bond, are those which contain at least one detachable substituent bonded to a heterocyclic or aliphatic radical, in particular those which contain at least one reactive substituent bonded to a 5-membered or 6-membered heterocyclic ring, such as to a monoazine, diazine or triazine ring, for example a pyridine, pyrimidine, pyridazine, pyrazine, thiazine, oxazine or asymmetric or symmetric triazine ring, or to a ring system of this type which contains one or more fused-on aromatic rings, such as a quinoline, phthalazine, quinazoline, quinoxaline, acridine, phenazine or phenanthridine ring system; the 5-membered or 6-membered heterocyclic rings, which contain at least one reactive substituent, are accordingly preferably those which contain one or more nitrogen atoms and can contain 5-membered or, preferably, 6-membered fused-on carbocyclic rings.

Examples which may be mentioned of the reactive substituents on the heterocyclic radical are: halogen (Cl, Br or F), ammonium, including hydrazinium, sulphonium, sulphonyl, azido ($N_3$), thiocyanato, thio, thiol ether, oxyether, sulphinic acid and sulphonic acid. Specific examples which may be mentioned are: mono- or di-halogeno-symmetric-triazinyl radicals, for example 2,4-dichlorotriazin-6-yl, 2-amino-4-chlorotriazin-6-yl, 2-alkylamino-4-chlorotriazin-6-yl, such as 2-methylamino-4-chlorotriazin-6-yl or 2-ethylamino- or 2-propylamino-4-chlorotriazin-6-yl, 2-β-hydroxyethylamino-4-chlorotriazin-6-yl, 2-di-β-hydroxyethylamino-4-chlorotriazin-6-yl and the corresponding sulphuric acid half-esters, 2-diethylamino-4-chlorotriazin-6-yl, 2-morpholino- or 2-piperidino-4-chlorotriazin-6-yl, 2-cyclohexylamino-4-chlorotriazin-6-yl, 2-arylamino- and substituted arylamino-4-chlorotriazin-6-yl, such as 2-phenylamino-4-chlorotriazin-6-yl, 2-(o-, m- or p-carboxy- or -sulphophenyl)-amino-4-chlorotriazin-6-yl and 2-(2',4'-, 2',5'- or 3',4'-disulphophenyl)-amino-4-chlorotriazin-6-yl, 2-alkoxy-4-chlorotriazin-6-yl, such as 2-methoxy- or -ethoxy-4-chlorotriazin-6-yl, 2-(phenyl-sulphonylmethoxy)-4-chlorotriazin-6-yl, 2-aryloxy- and substituted aryloxy-4-chlorotriazin-6-yl, such as 2-phenoxy-4-chlorotriazin-6-yl, 2(p-sulphophenyl)-hydroxy-4-chlorotriazin-6-yl and 2-(o-, m- or p-methyl- or -methoxyphenyl)-hydroxy-4-chlorotriazin-6-yl, 2-alkylmercapto- or 2-arylmercapto- or 2-(substituted aryl)-mercapto-4-chlorotriazin-6-yl, such as 2-β-hydroxyethylmercapto-4-chlorotriazin-6-yl, 2-phenylmercapto-4-chlorotriazin-6-yl, 3-(4'-methylphenyl)-mercapto-4-chlorotriazin-6-yl and 2-(2',4'-dinitro)-phenyl-mercapto-4-chlorotriazin-6-yl, 2-methyl-4-chlorotriazin-6-yl, 2-phenyl-4-chlorotriazin-6-yl, 2,4-difluorotriazin-6-yl, monofluorotriazinyl radicals which are substituted by amino, alkylamino, aralkylamino or arylamino groups, alkyl denoting, in particular, optionally substituted $C_1$–$C_4$-alkyl, aralkyl denoting, in particular, optionally substituted phenyl-$C_{1-C4}$-alkyl and aryl denoting, in particular, phenyl or naphthyl which is optionally substituted by sulpho, alkyl, in particular $C_1$–$C_4$-alkyl, alkoxy, in particular $C_1$–$C_{14}$-alkoxy, carboxylic acid or acylamino groups and halogen atoms, such as fluorine, chlorine or bromine, for example 2-amino-4-fluorotriazin-6-yl, 2-methylamino-4-fluorotriazin-6-yl, 2-ethylamino-4-fluorotriazin-6-yl, 2-isopropylamino-4-fluorotriazin-6-yl, 2-dimethylamino-4-fluorotriazin-6-yl, 2-diethylamino-4-fluorotriazin-6-yl, 2-β-methoxy-ethylamino-4-fluorotriazin-6-yl, 2-β-hydroxyethylamino-4-fluorotriazin-6-yl, 2-di-(β-hydroxyethylamino)-4-fluorotriazin-6-yl, 2-β-sulphoethylamino-4-fluorotriazin-6-yl, 2-β-sulphoethylmethylamino-4-fluorotriazin-6-yl, 2-carboxymethylamino-4-fluorotriazin-6-yl, 2-β-cyanoethylamino-4-fluorotriazin-6-yl, 2-benzylamino-4-fluorotriazin-6-yl, 2-β-phenylethylamino-4-fluorotriazin-6-yl, 2-benzylmethylamino-4-fluorotriazin-6-yl, 2-(x-sulphobenzyl)-amino-4-fluorotriazin-6-yl, 2-cyclohexylamino-4-fluorotriazin-6-yl, 2-(o-, m- or p-methylphenyl)-amino-4-fluorotriazin-6-yl, 2-(o-, m- or p-sulphophenyl)-amino-4-fluorotriazin-6-yl, 2-(2,',5'-disulphophenyl)-amino-4-fluorotriazin-6-yl, 2-(o-, m- or p-chlorophenyl)-amino-4-fluorotriazin-6-yl, 2-(o-, m- or p-methoxyphenyl)-4-fluorotriazin-6-yl, 2-(2'-methyl-4'-sulphophenyl)-amino-4-fluorotriazin-6-yl, 2-(2'-methyl-5'-sulphophenyl)-amino-4-fluorotriazin-6-yl, 2-(2'-chloro-4'-sulphophenyl)-amino-4-fluorotriazin-6-yl, 2-(2'-chloro-5'-sulphophenyl)-amino-4-fluorotriazin-6-yl, 2-(2'-methoxy-4'-sulphophenyl)-amino-4-fluorotriazin-6-yl, 2-(o-, m- or p-carboxyphenyl)-amino-4-fluorotriazin-6-yl, 2-(2',4'-disulphophenyl)-amino-4-fluorotriazin-6-yl, 2-(3',5'-disulphophenyl)-amino-4-fluorotriazin-6-yl, 2-(2'-carboxy-4-sulphophenyl)-amino-4-fluorotriazin-6-yl, 2-(6'-sulphonaphth-2'-yl)-amino-4-fluorotriazin-6-yl, 2-(4',8'-disulphonaphth-2'-yl)-amino-4-fluorotriazin-6-yl, 2-(6',8'-disulphonaphth-2'-yl)-amino-4-fluorotriazin-6-yl, 2-(N-methylphenyl)-amino-4-fluorotriazin-6-yl, 2-(N-ethylphenyl)-amino-4-fluorotriazin-6-yl, 2-(N-β-hydroxyethylphenyl)-amino-4-fluorotriazin-6-yl, 2-(N-isopropylphenyl)-amino-4-fluorotriazin-6-yl, 2-morpholino-4-fluorotriazin-6-yl, 2-piperidino-4-fluorotriazin-6-yl, 2-(4',6',8'-trisulphonaphth-2'-yl)-4-fluorotriazin-6-yl, 2-(3',6',8'-trisulphonaphth-2'-yl)-4-fluorotriazin-6-yl, 2(3',6'-disulphonaphth-1'-yl)-4-fluorotriazin-6-yl, 2-chloro- or 2-fluoro-4-(4'-β-sulphatoethylsulphonylphenylamino)-6-triazinyl, 2-chloro- or 2-fluoro-4-(3'-β-sulphatoethylsulphonylphenylamino)-6-triazinyl, 2-chloro- and 2-fluoro-4-(β-(β'-sulphatoethylsulphonyl)-ethylamino)-6-triazinyl and 2-fluoro-4-bis(β-(β-chloroethylsulphonyl)-ethyl)-amino-6-triazinyl.

The halogenotriazinyl radicals can also be linked with a second halogenotriazinyl radical. Examples of radicals of this type are the following:

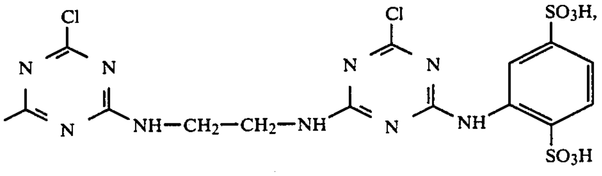

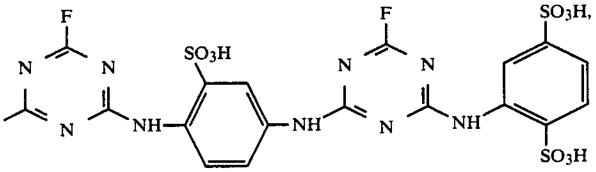

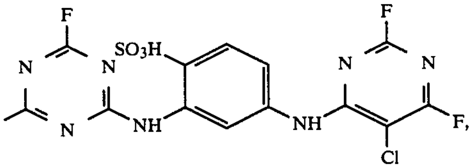

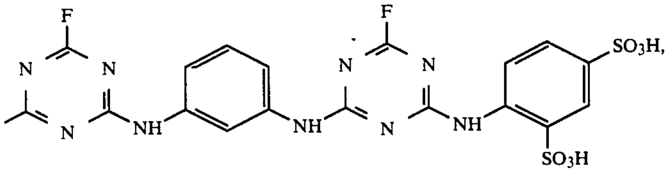

-continued

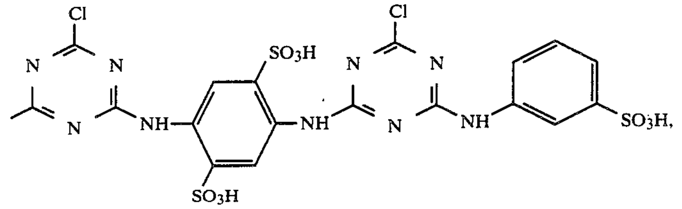
,

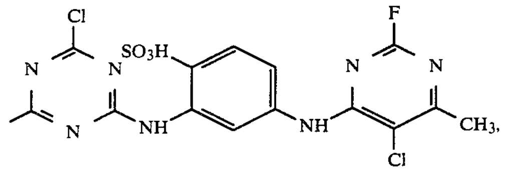
,

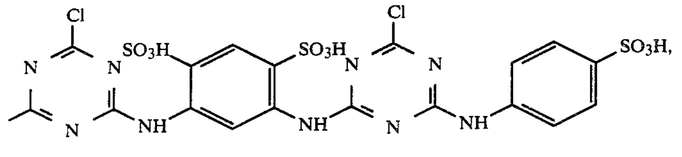
,

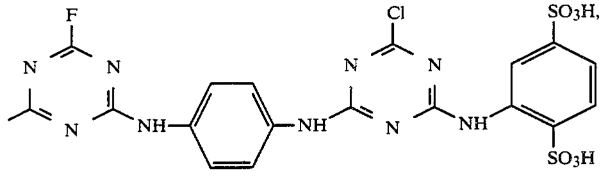
,

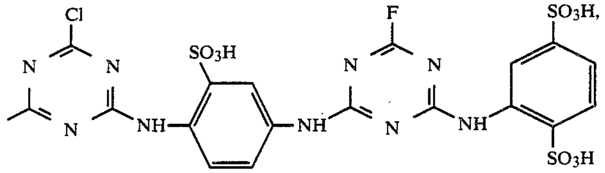

The reactive halogen atoms in the abovementioned 2-halogeno-4-substituted-triazinyl radicals can also be replaced by tertiary bases, such as trimethylamine, triethylamine, dimethyl-β-hydroxyethylamine, triethanolamine, N,N-dimethylhydrazine, pyridine, α- or γ-picoline, nicotinic acid or isonicotinic acid, to form quaternary salts.

Further examples of reactive substituents are mono-, di- or tri-halogenopyrimidinyl radicals, such as 2,4-dichloropyrimidin-6-yl, 2,4,5-trichloropyrimidin-6-yl, 2,4-dichloro-5-nitro-, -5-methyl-, -5-carboxymethyl-, -5-carboxy-, -5-cyano-, -5-vinyl, -5-sulpho-, -5-mono-, -di- or -tri-chloromethyl- or -5-carboalkoxy-pyrimidin-6-yl, 2,6-dichloropyrimidine-4-carbonyl, 2,4-dichloropyrimidine-5-carbonyl, 2-chloro-4-methyl-pyrimidine-5-carbonyl, 2-methyl-4-chloropyrimidine-5-carbonyl, 2-methylthio-4-fluoropyrimidine-5-carbonyl, 6-methyl-2,4-dichloropyrimidine-5-carbonyl, 2,4,6-trichloropyrimidine-5-carbonyl, 2,4-dichloropyrimidine-5-sulphonyl, 2-chloroquinoxaline-3-carbonyl, 2- or 3-monochloroquinoxaline-6-carbonyl, 2- or 3-monochloroquinoxaline-6-sulphonyl, 2,3-dichloroquinoxaline-6-carbonyl, 2,3-dichloroquinoxaline-6-sulphonyl, 1,4-dichlorophthalazine-6-sulphonyl or -6-carbonyl, 2,4-dichloroquinazoline-7- or -6-sulphonyl or -carbonyl, 2- or 3- or 4-(4',5'-dichloro-6'-pyridazon-1'-yl)-phenyl-sulphonyl or -carbonyl, 4-(4',5'-dichloro-6'-pyridazon-1'-yl)-ethylcarbonyl, N-methyl-N-(2,4-dichlorotriazin-6-yl)-carbamyl, N-methyl-N-(2-methylamino-4-chloro-triazin-6-yl)-carbamyl, N-methyl-N-(2-dimethylamino-4-chlorotriazin-6-yl)-carbamyl, N-methyl- or N-ethyl-N-(2,4-dichlorotriazin-6-yl)-aminoacetyl, N-methyl-N-(2,3-dichloroquinoxaline-6-sulphonyl)-aminoacetyl, N-methyl-N-(2,3-dichloroquinoxaline-6-carbonyl)-aminoacetyl and the corresponding bromine and fluorine derivatives of the abovementioned chlorine-substituted heterocyclic radicals, and of these, for example, 2-fluoro-4-pyrimidinyl, 2,6-difluoro-4-pyrimidinyl, 2,6-difluoro-5-chloro-4-pyrimidinyl, 2-fluoro-5,6-dichloro-4-pyrimidinyl, 2,6-difluoro-5-methyl-4-pyrimidinyl, 2-fluoro-5-methyl-6-chloro-4-pyrimidinyl, 2-fluoro-5-nitro-6-chloro-4-pyrimidinyl, 5-bromo-2-fluoro-4-pyrimidinyl, 2-fluoro-5-cyano- 4-pyrimidinyl, 2-fluoro-5-methyl-4-pyrimidinyl, 2,5,6-trifluoro-4-pyrimidinyl, 5-chloro-6-chloromethyl-2-fluoro-4-pyrimidinyl, 2,6-difluoro-5-bromo-4-pyrimidinyl, 2-fluoro-5-bromo-6-methyl-4-pyrimidinyl, 2-fluoro-5-bromo-6-chloromethyl-4-pyrimidinyl, 2,6-difluoro-5-chloromethyl-4-pyrimidinyl, 2,6-difluoro-5-nitro-4pyrimidinyl, 2-fluoro-6-methyl-4-pyrimidinyl, 2-fluoro-5-chloro-6-methyl-4-pyrimidinyl, 2-fluoro-5-chloro-4-pyrimidinyl, 2-fluoro-6-chloro-4-pyrimidinyl, 6-trifluoromethyl-5-chloro-2-fluoro-4-pyrimidinyl, 6-trifluoromethyl-2-fluoro-4-pyrimidinyl, 2-fluoro-5-nitro-4-pyrimidinyl, 2-fluoro-5-trifluoromethyl-4-pyrimidinyl, 2-fluoro-5-phenyl- or -5-methyl-sulphonyl-4-pyrimidinyl, 2-fluoro-5-carboxamido-4-pyrimidinyl, 2-fluoro-5-carbomethoxy-4-pyrimidinyl, 2-fluoro-5-bromo-6-trifluoromethyl-4-pyrimidinyl, 2-fluoro-6-carboxamido-4-pyrimidinyl, 2-fluoro-6-carbomethoxy-4-pyrimidinyl, 2-fluoro-6-phenyl-4-pyrimidinyl, 2-fluoro-6-cyano-4-pyrimidinyl, 2-fluoro-4-dichloromethyl-5-chloropyrimidin-6-yl, 2-fluoro-5-chloropyrimidin-4-yl, 2-methyl-4-fluoro-5-methylsulphonylpyrimidin-6-yl, 2,6-difluoro-5-methylsulphonyl-4-pyrimidinyl, 2,6-dichloro-5-methylsulphonyl-4-pyrimidinyl, 2-fluoro-5-sulphonamido-4-pyrimidinyl, 2-fluoro-5-chloro-6-carbomethoxy-4-pyrimidinyl and 2,6-difluoro-5-trifluoromethyl-4-pyrimidinyl; triazine radicals containing sulphonyl groups, such as 2,4-bis-(phenylsulphonyl)-triazin-6-yl, 2-(3'-carboxyphenyl)-sulphonyl-4-chlorotriazin-6-yl, 2-(3'-sulphophenyl)-sulphonyl-4-chlorotriazin-6-yl and 2,4-bis-(3'-carboxyphenylsulphonyl)-triazin-6-yl; pyrimidine rings containing sulphonyl groups, such as 2-carboxymethylsulphonyl-pyrimidin-4-yl, 2-methylsulphonyl-6-methylpyrimidin-4-yl, 2-methylsulphonyl-6-ethyl-pyrimidin-4-yl, 2-phenylsulphonyl-5-chloro-6-methyl-pyrimidin-4-yl, 2,6-bis-methylsulphonyl-pyrimidin-4-yl, 2,6-bis-methylsulphonyl-5-chloro-pyrimidin-4-yl, 2,4-bis-methylsulphonyl-pyrimidine-5-sulphonyl, 2,-methylsulphonyl-pyrimidin-4-yl, 2-phenylsulphonyl-pyrimidin-4-yl, 2-trichloromethylsulphonyl-6-methyl-pyrimidin-4-yl, 2-methylsulphonyl-5-chloro-6-methyl-pyrimidin-4-yl, 2-methylsulphonyl-5-bromo-6-methyl-pyrimidin-4-yl, 2-methylsulphonyl-5-chloro-6-ethyl -pyrimidin-4-yl, 2-methylsulphonyl-5-chloro-6-chloromethyl-pyrimidin-4-yl, 2-methylsulphonyl-4-chloro-6-methyl-pyrimidine-5-sulphonyl, 2methylsulphonyl-5-nitro-6-methyl-pyrimidin-4-yl, 2,5,6-trismethylsulphonyl-pyrimidin-4-yl, 2-methylsulphonyl-5,6-dimethyl-pyrimidin-4-yl, 2-ethylsulphonyl-5-chloro-6-methyl-pyrimidin-4-yl, 2-methylsulphonyl-6-chloro-pyrimidin-4-yl, 2,6-bis-methylsulphonyl-5-chloro-pyrimidin-4-yl, 2-methylsulphonyl-6-carboxy-pyrimidin-4-yl, 2-methylsulphonyl-5-sulpho-pyrimidin-4-yl, 2-methylsulphonyl-6-carbomethoxy-pyrimidin-4-yl, 2-methylsulphonyl-5-carboxypyrimidin-4-yl, 2-methylsulphonyl-5-cyano-6-methoxy-pyrimidin-4-yl, 2-methylsulphonyl-5-chloro-pyrimidin-4-yl, 2-sulphoethylsulphonyl-6-methyl-pyrimidin-4-yl, 2-methylsulphonyl-5-bromo-pyrimidin-4-yl, 2-phenylsulphonyl-5-chloro-pyrimidin-4-yl, 2-carboxymethylsulphonyl-5-chloro-6-methyl-pyrimidin-4-yl, 2-methylsulphonyl-6-chloropyrimidine-4- and -5-carbonyl, 2,6-bis-(methylsulphonyl)-pyrimidine-4- or -5-carbonyl, 2-ethylsulphonyl-6-chloropyrimidine-5-carbonyl, 2,4-bis-(methylsulphonyl)-pyrimidine-5-sulphonyl and 2-methylsulphonyl-4-chloro-6-methyl-pyrimidine-5-sulphonyl or -carbonyl; triazine rings containing ammonium groups, such as 2-trimethylammonium-4-phenyl-amino- or -4-(o-, m- or p-sulphophenyl)-amino-triazin-6-yl, 2-(1,1-dimethylhydrazinium)-4-phenyl-amino- or -4-(o-, m- or p-sulphophenyl)-aminotriazin-6-yl, 2-(2-isopropylidene-1,1-dimethyl)-hydrazinium-4-phenyl-amino- or -4-(o-, m- or p-sulphophenyl-)amino-triazin-6-yl and 2-N-aminopyrrolidinium- or 2-N-aminopiperidinium-4-phenyl-amino- or -4-(o-, m- or p-sulphophenyl)-amino-triazin-6-yl, and furthermore 4-phenylamino- or 4-(sulphophenylamino)-triazin-6-yl radicals which contain 1,4-bisazabicyclo-[2,2,2]-octane or 1,2-bis-aza-bicyclo-[0,3,3]-octane bonded in quaternary form in the 2-position via a nitrogen bond, and 2-pyridinium-4-phenyl-amino- or -4-(o-, m- or p-sulphophenyl)amino-triazin-6-yl and the corresponding 2-onium-triazin-6-yl radicals which are substituted in the 4-position by alkylamino, such as methylamino, ethylamino or $\beta$-hydroxyethylamino, alkoxy, such as methoxy or ethoxy, aryloxy, such as phenoxy, or sulphophenoxy groups; 2-chlorobenzothiazole-5- or -6-carbonyl or -5- or -6-sulphonyl, 2-arylsulphonyl- or -alkylsulphonyl-benzothiazole-5- or -6-carbonyl or -5- or -6-sulphonyl, such as 2-methylsulphonyl- or 2-ethylsulphonyl-benzothiazole-5- or -6-sulphonyl or -carbonyl, 2-phenylsulphonylbenzothiazole-5- or -6-sulphonyl or -carbonyl and the corresponding 2-sulphonylbenzothiazole-5- or --b 6-carbonyl or -sulphonyl derivatives containing sulpho groups in the fused-on benzene ring, 2-chlorobenzoazole-5- or -6-carbonyl or -sulphonyl, 2-chlorobenzimidazole-5- or -6-carbonyl or -sulphonyl, 2-chloro-1-methylbenzimidazole-5- or -6-carbonyl or -sulphonyl, 2-chloro-4-methylthiazole-(1,3)-5-carbonyl or -4- or -5-sulphonyl, and the N-oxide of 4-chloro- or 4-nitro-quinoline-5-carbonyl.

Reactive groups of the aliphatic series may furthermore be mentioned, such as acryloyl, mono-, di- or tri-chloroacryloyl, such as $-CO-CH=CH-Cl$, $-CO-CCl=CH_2$ and $-CO-CCl=CH-CH_3$, and furthermore $-CO-CCl=CH-COOH$, $-CO-CH=CCl-COOH$, $\beta$-chloropropionyl, 3-phenylsulphonylpropionyl, 3-methylsulphonylpropionyl, $\beta$-sulphato-ethylaminosulphonyl, vinylsulphonyl, $\beta$-chloroethylsulphonyl, $\beta$-sulphatoethylsulphonyl, $\beta$-phosphatoethylsulphonyl, $\beta$-thiosulphatoethylsulphonyl, $\beta$-methylsulphonylethylsulphonyl, $\beta$-phenylsulphonylethylsulphonyl, 2-fluoro-2-chloro-3,3-difluorocyclobutane-1-carbonyl, 2,2,3,3-tetrafluorocyclobutane-1-carbonyl or -1-sulphonyl, $\beta$-(2,2,3,3-tetrafluoro-1-cyclobutyl)-acryloyl and - or -bromoacryloyl, or $\alpha$- or $\beta$-alkyl- or -aryl-sulphonylacryloyl groups, such as $\alpha$- or $\beta$-methylsulphonylacryloyl and $\alpha,\beta$-dichloro- or dibromo-propionyl.

Preferred fibre-reactive radicals are, however, those which contain at least one reactive substituent bonded to a 5-membered or 6-membered heterocyclic ring.

Preferred dyestuffs of the formula (I) are those of the formula (V)

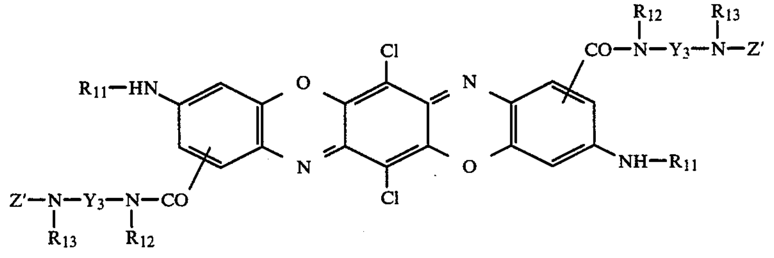

wherein $R_{12}$ and $R_{13}$=H, $C_1$-$C_4$-alkyl or, together, $-CH_2CH_2-$, $R_{11}$=H or $C_1$-$C_6$-alkyl, $Y_3$=optionally substituted $C_2$–$C_6$-alkylene, cyclohexylene or optionally substituted phenylene and Z'=a heterocyclic fibre-reactive radical, and those of the formula

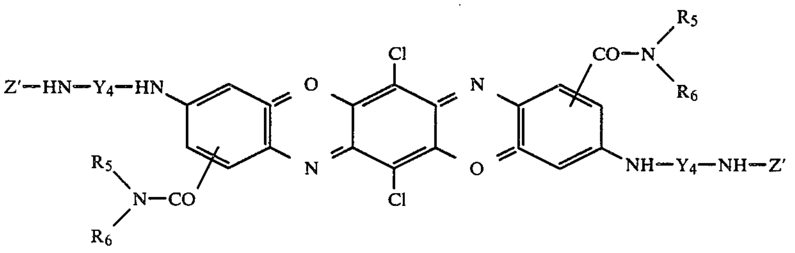

(VI)

wherein $Y_4$=$C_2$–$C_6$-alkylene or cyclohexylene.

The abovementioned alkyl, alkylene, aryl and arylene radicals can be further substituted, in particular by —$SO_3H$, —COOH, —$OSO_3H$, —OH or —$OC_1$–$C_4$alkyl.

Particularly preferred dyestuffs of the formulae (V) and (VI) are those of the formula

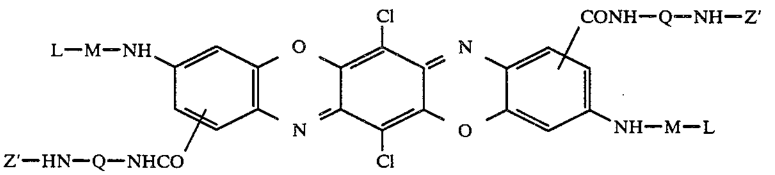

(VII)

wherein

L=$SO_3H$, $OSO_3H$, OH or COOH,

M=$C_1$–$C_6$-alkylene and

Q=$C_2$–$C_6$-alkylene, and those of the formula

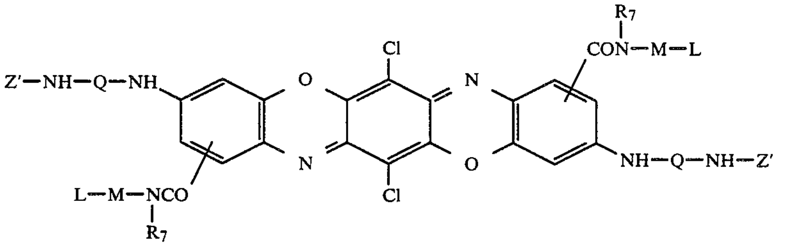

(VIII)

wherein $R_7$=H, —$CH_3$, —$CH_2$—$CH_2$—$SO_3H$, —$CH_2$—$CH_2$—$OSO_3H$, —$CH_2$—$CH_2OH$ or —$CH_2$—COOH, and furthermore those of the formula

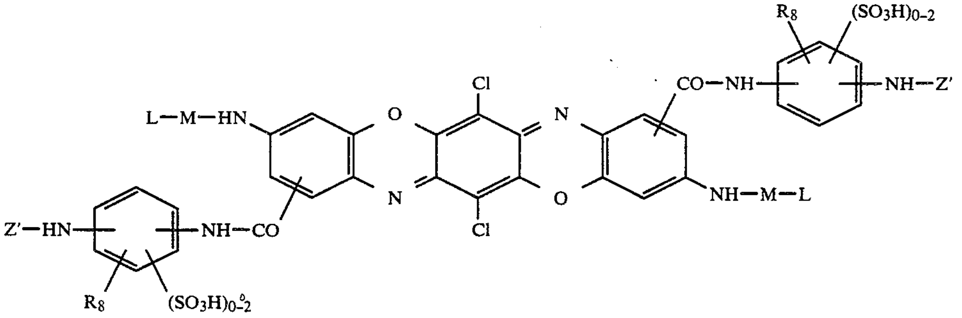

(IX)

wherein $R_8$=H, $CH_3$, Cl or $OCH_3$, and moreover those of the formula

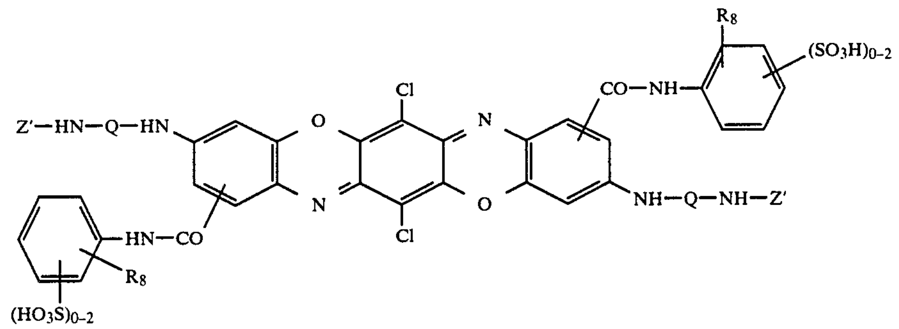

(X)

and also those of the formula

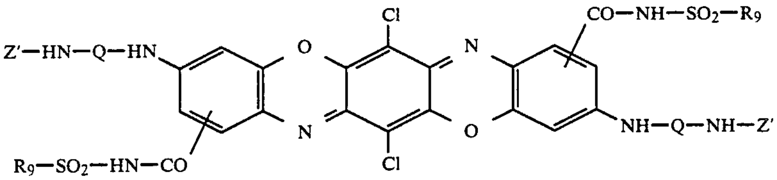

(XI)

wherein $R_9=C_1$-$C_4$-alkyl, phenyl or tolyl, and finally those of the formula

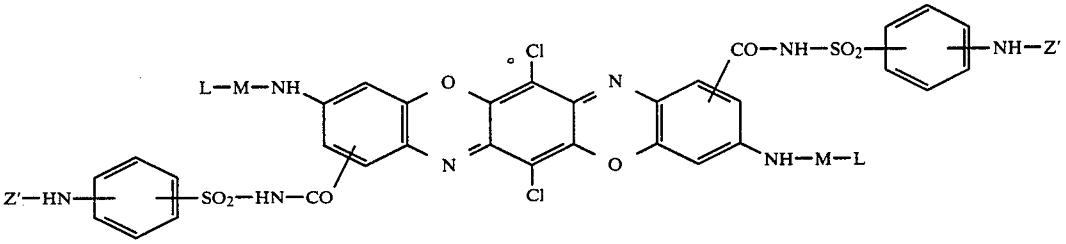

(XII)

In the context of the dyestuffs according to the invention, particularly preferred dyestuffs are those with a fluoro- or chloro-s-triazinyl radical which contains, as a further substituent, an amino group which is optionally substituted by alkyl or aryl radicals, in particular optionally substituted phenyl radicals, or those which contain a fluoro- or chloro-pyrimidinyl radical.

The invention also relates to dyestuffs which are free from reactive groups, of the formula

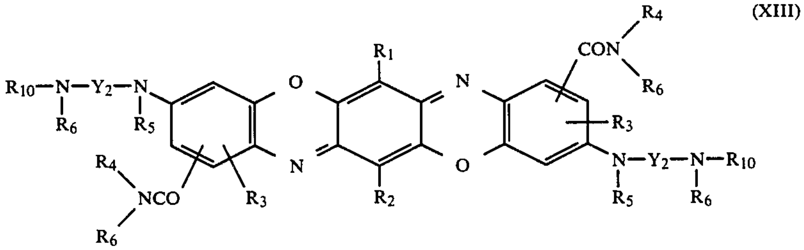

(XIII)

wherein $R_{10}=H$ or the radical of a sulphonic acid or carboxylic acid which is free from reactive groups, and those of the formula

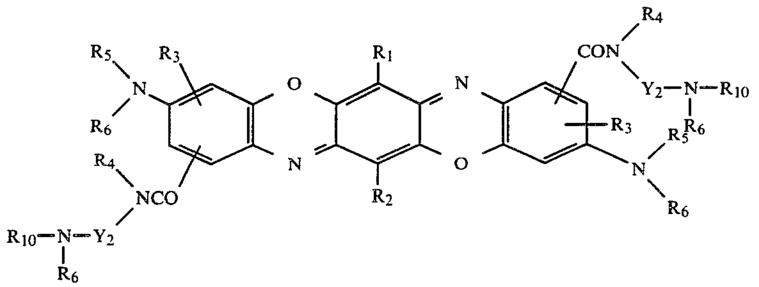
(XIV)

and of the formula

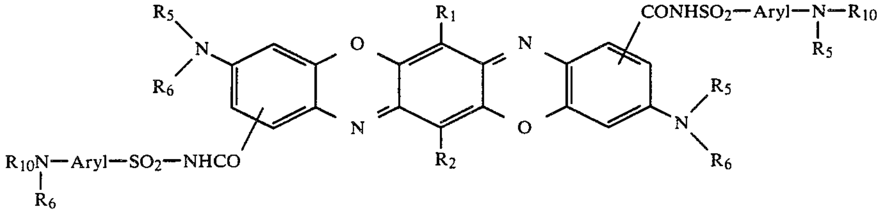
(XV)

Dyestuffs of the formula (I) are obtained, for example, in a manner which is known per se by reacting compounds of the formulae (XIII), (XIV) and (XV), where $R_{10}=H$, with reactive components Z-halogen (XVI), wherein Z has the abovementioned meaning and halogen is F, Cl or Br.

The condensation of the dioxazine compounds of the formulae (XIII), (XIV) and (XV) and the reactive components (XVI) is either carried out in an aqueous or aqueous-organic medium, depending on the reactive component employed, at temperatures of 0°–80° C. and at pH values of 3–9 in the presence of alkaline condensing agents, such as aqueous alkali metal bicarbonate, alkali metal carbonate, alkali metal hydroxide, alkali metal hydrogen phosphate, di-alkali metal hydrogen phosphate or tri-alkali metal phosphate solution, or the condensation is completed in aprotic organic solvents, such as toluene, halogenobenzenes, nitrobenzene, dimethylformamide, N-methylpyrrolidone, tetramethylene sulphone, dimethylsulphoxide, acetone or methyl ethyl ketone, if appropriate in the presence of aprotic organic bases, such as trialkylamines, N,N-dialkylanilines, pyridine or alkylpyridines, at temperatures of 0°–80° C.

The preparation of compounds of the formulae (XIII), (XIV) and (XV) is carried out by methods which are known per se, by a process in which 1,4-benzoquinones of the formula

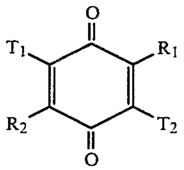
(XVII)

wherein $R_1$ and $R_2$ have the abovementioned meaning and $T_1$ and $T_2$ denote hydrogen, Cl, Br, Oalkyl or Oaryl, are subjected to a condensation reaction with 5-amino-2-(substituted amino)-benzoic acid amides of the formula

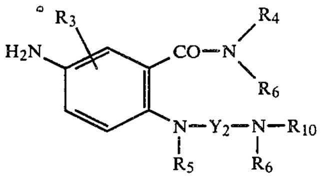
(XVIII)

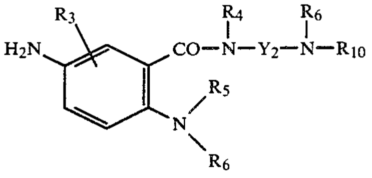
(XIX)

or

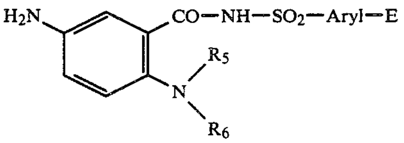
(XX)

wherein

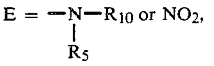

to give compounds of the formula (XXI)-(XXIII)

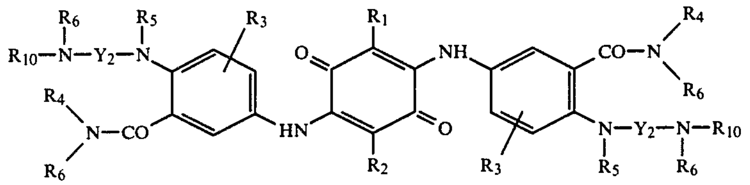

(XXI)

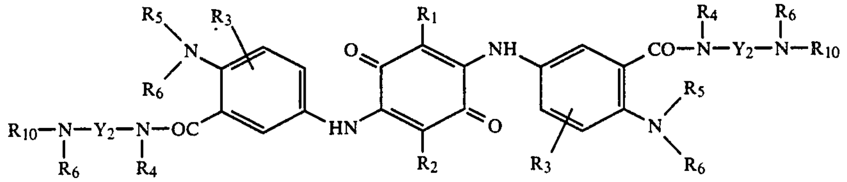

(IIXX)

or

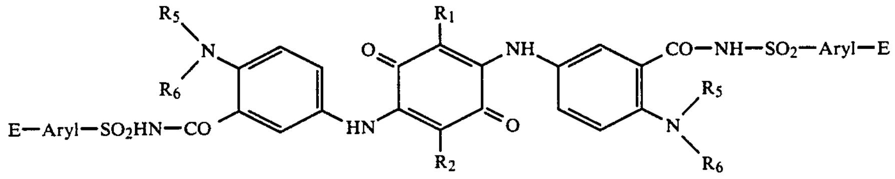

(XXIII)

with subsequent cyclisation of the anil compounds (XXI) to (XXIII) to give the dioxazine colour bases (XIII) to (XV), it also being necessary, in the case of the formula (XV), to convert E into $NHR_5$ by hydrolysis of the acylamino groups or reduction of the nitro group.

Depending on the reaction conditions applied during the cyclisation, the substituted carboxamide group in the dioxazines (XIII) to (XV) can occur in the benzo rings of the dioxazine system either in the o- or in the p-position relative to the ring oxygen atoms of the dioxazine system.

The condensation of the benzoquinones of the formula (XVII) with the aminobenzene-sulphonamides of the formula (XVIII)-(XX) is best carried out in an aqueous or aqueous-organic medium with the addition of alkaline condensing agents at pH values of 3-11, preferably 4-8, and temperatures of 20°-90° C., preferably 40°-70°, or in buffered solutions containing the above alkaline condensing agents. The reaction can also be carried out in a purely organic medium with the addition of acid-binding agents.

Examples of alkaline condensing agents are sodium bicarbonate, sodium carbonate, sodium or potassium acetate, sodium hydroxide solution, potassium hydroxide solution, sodium phosphates and sodium borate.

The condensation products of the formulae (XXI)-(XXIII) are in general obtained as sparingly soluble, brown products.

The 2-alkylamino- or 5-amino-2(substituted amino)-benzenecarboxylic acid amides of the formulae (XVIII)-(XX) employed can be obtained by stepwise condensation of 2-chloro-5-nitrobenzenecarboxylic acid chloride with ammonia or alkyl- or aryl-amines or substituted sulphonamides, with subsequent catalytic reduction of the nitro group.

One variant for the preparation of compounds of the formulae (XXI)-(XXIII) consists of the addition of aminobenzenecarboxylic acids of the formulae (XVIII)-(XX) to 1,4-benzoquinones of the formula

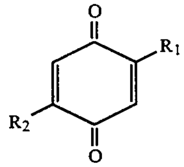

(XV)

wherein $R_1$ and $R_2$ have the abovementioned meaning, and oxidation of the adducts primarily formed.

The cyclisation of the quinone condensation products (XXI) to (XXIII) can be carried out by methods which are known per se, such as those mentioned in German Offenlegungsschriften Nos. 2,122,262, 2,124,080, 2,302,382, 2,344,781, 2,503,611 and 2,823,828, and in British Patent Specification No. 2,019,872, in particular in concentrated sulphuric acid and, in particular in oleum with $SO_3$ contents of 1-50%, at temperatures in 10°-80° C., if appropriate with the addition of oxidising agents, such as potassium peroxydisulphate or ammonium peroxydisulphate or organic peroxides.

The new dyestuffs in the blue shade range are useful products which are distinguished by high tinctorial strength. They are suitable for the most diverse application purposes in dispersed or dissolved form.

In the form of water-soluble compounds, they are preferably of interest for dyeing textile materials containing hydroxyl or amide groups, in particular materials of natural or regenerated cellulose and synthetic polyamide and polyurethane fibres, wool and silk.

If the dyestuffs are water-soluble reactive dyestuffs, the materials mentioned are dyed or printed by the generally known processes which are customary for reactive dyestuffs. Blue dyeings and prints which are fast to light and wet processing are then obtained.

The temperature data in the examples are in °C. The formulae of the water-soluble dyestuffs in the description and in the examples are those of the free acids. If the dyestuffs are reactive dyestuffs, these are as a rule isolated and used in the form of their alkali metal salts, in particular the sodium or potassium salts.

EXAMPLE 1

12.6 g of 2-aminobenzene-1,4-disulphonic acid are dissolved in 50 ml of water by dropwise addition of 10% strength sodium carbonate solution and by bringing the pH value to 5.5. After the solution has cooled, 5.0 ml of cyanuric fluoride are added dropwise at 0°-5° C. in the course of 5 minutes, the pH value is kept at 4.5-4.7 by means of 10% strength sodium carbonate solution and stirring is continued for a further 20 minutes under the stated conditions in order to bring the condensation reaction to completion.

13.3 g of a dioxazine-carboxamide component of the formula

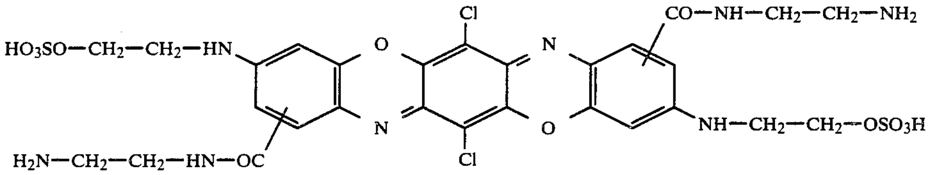

prepared by condensation 2,3,5,6-tetrachloroquinone with 5-amino-2-β-hydroxyethylamino-benzoic acid β-aminoethylamide and subsequent oxidative cyclisation of the condensation product in oleum, are dissolved in 250 ml of water at pH 12.0 by addition of 2N sodium hydroxide solution.

The solution of the reactive component and of the colour substance are now simultaneously added dropwise to 50 ml of water at 0°-5° C. such that a pH value of 9.0 is established in the reaction mixture and the two solutions have simultaneously been introduced in the course of about 15 minutes.

The solution formed is kept at pH 8.8-9.0 with 1N sodium hydroxide solution for a further few hours at 0°-5° C. in order to bring the condensation reaction to completion. The temperature is then allowed to rise to 20° C. overnight, with continuous control of the pH, the pH value is brought to 7.5 and the resulting reactive dyestuff is then salted out with 22% of sodium chloride. The resulting precipitate is filtered off with suction, washed with sodium chloride solution and, after addition of phosphates as a buffer, is dried at 50° C. in a circulating air cabinet. The resulting dyestuff corresponds, in the form of the free acid, to the formula

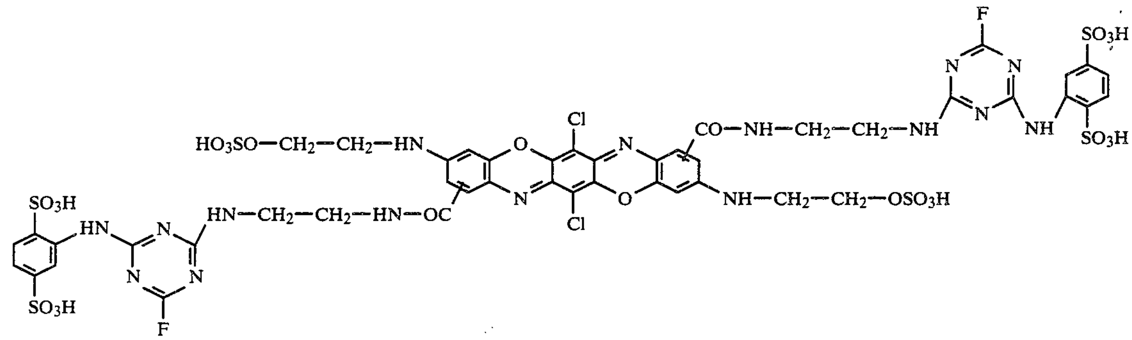

and dyes cotton by the known dyeing and printing techniques in clear, strong blue shades. $\lambda_{max}$=589 nm in water.

Further similar reactive dyestuffs which dye cellulose fibres blue are obtained when the following dioxazine-carboxamide components described below are subjected to a condensation reaction with the reactive components listed. ($\lambda_{max}$ in water: 589 nm).

| Dioxazine-carboxamide component | Reactive component | $\lambda_{max}$ in water |
|---|---|---|
| 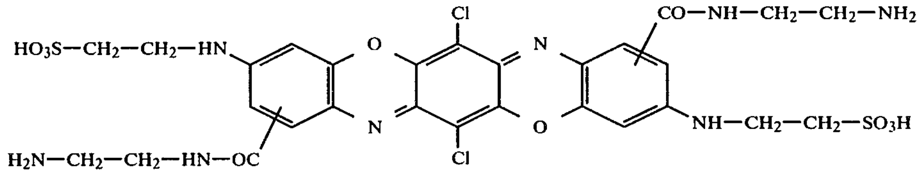 | 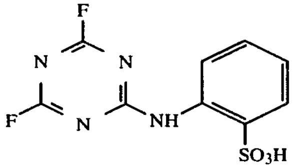 | 589 nm |
| 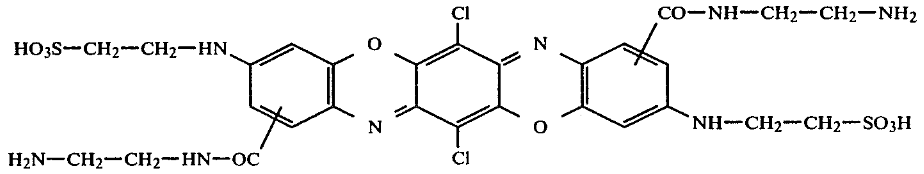 | 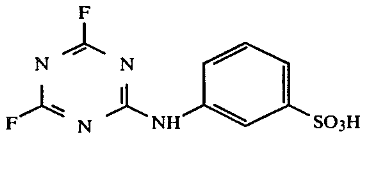 | |
| 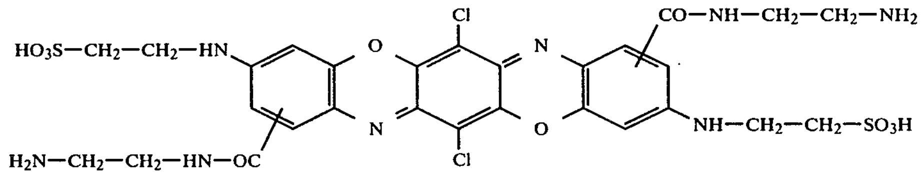 | 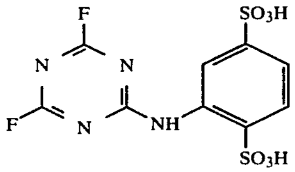 | 594 nm |
| 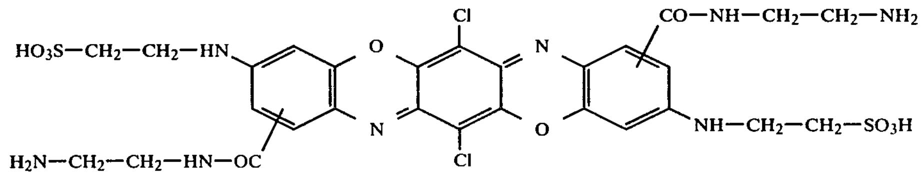 | 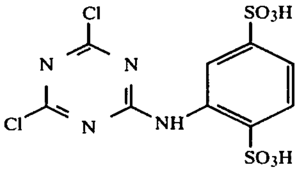 | |
| 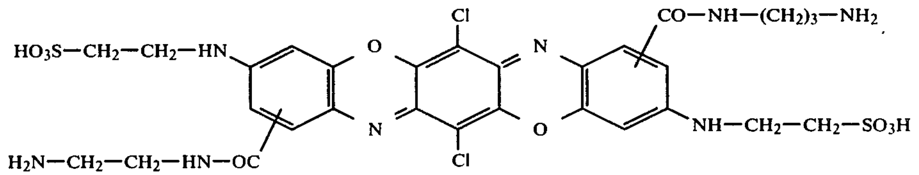 | 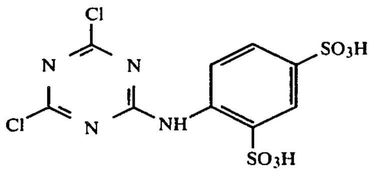 | |

-continued
| Dioxazine-carboxamide component | Reactive component | $\lambda_{max}$ in water |
| --- | --- | --- |
| 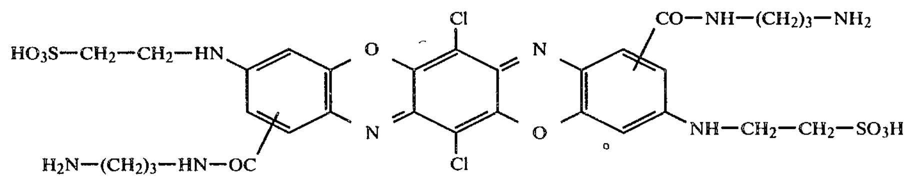 | 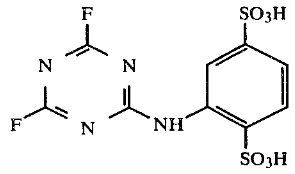 | |
| 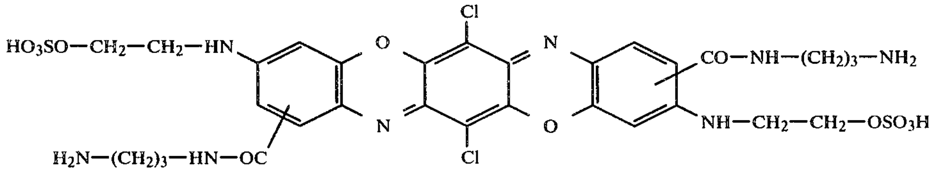 | 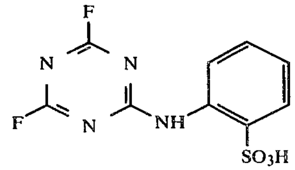 | 593 nm |
| 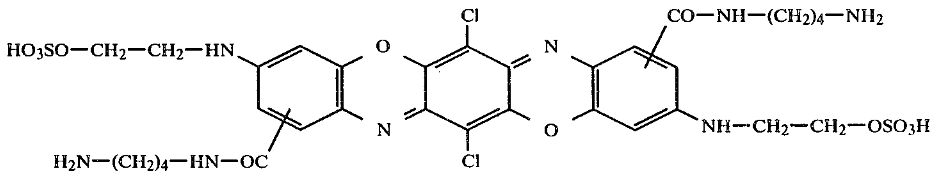 | 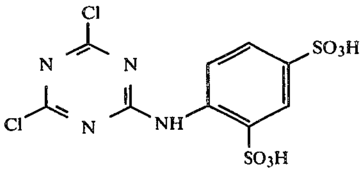 | |
| 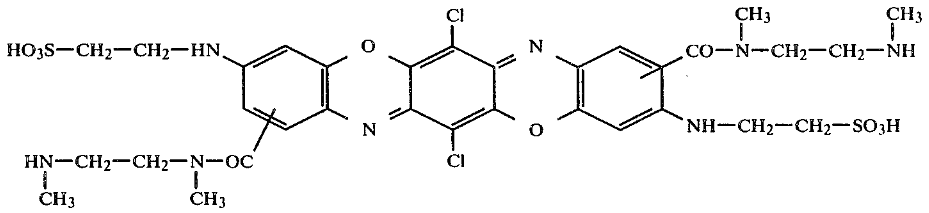 | 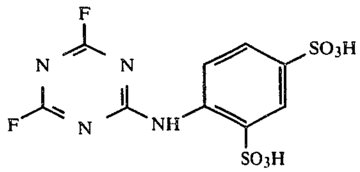 | |
| 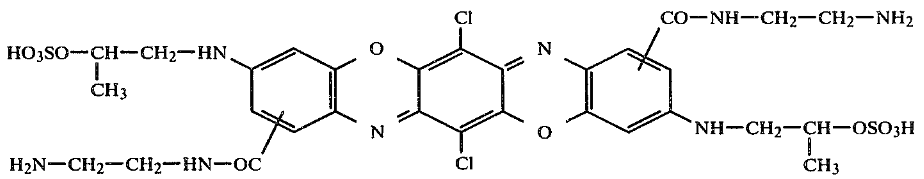 | 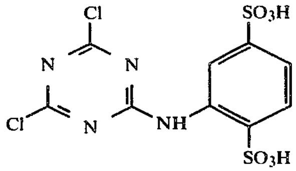 | |

-continued
| Dioxazine-carboxamide component | Reactive component | $\lambda_{max}$ in water |
|---|---|---|
| 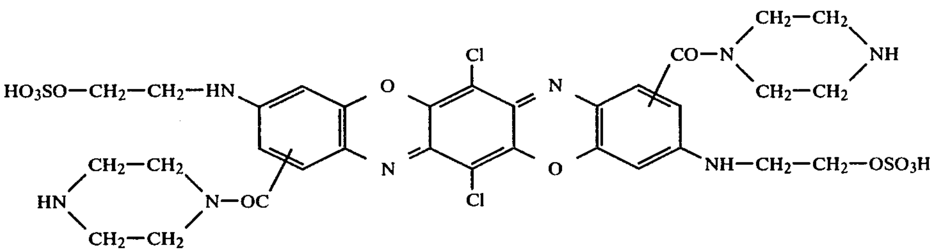 | 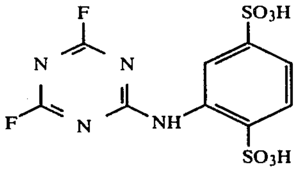 | |
| 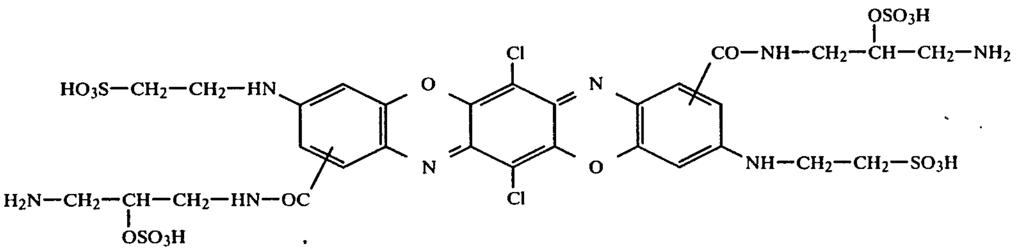 | 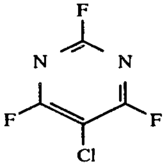 | |
| 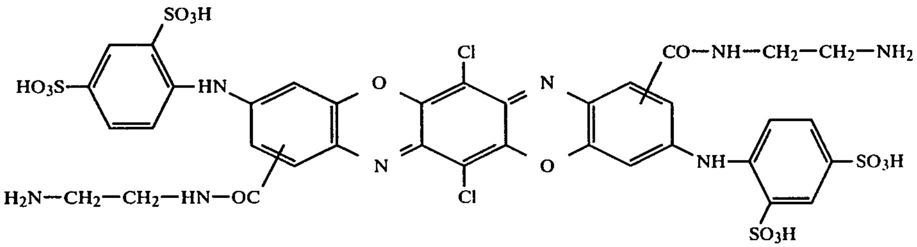 | 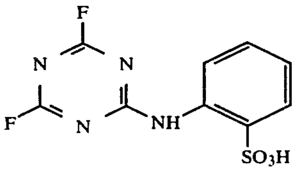 | |
| 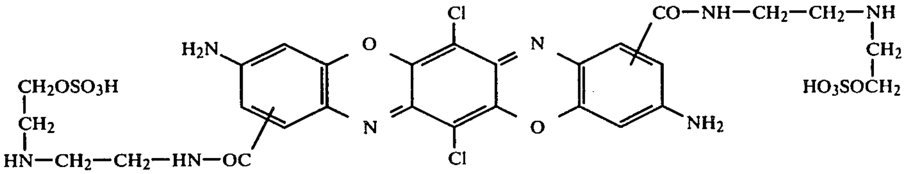 | 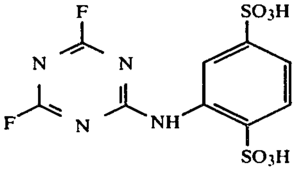 | |

-continued
| Dioxazine-carboxamide component | Reactive component | $\lambda_{max}$ in water |
|---|---|---|
| 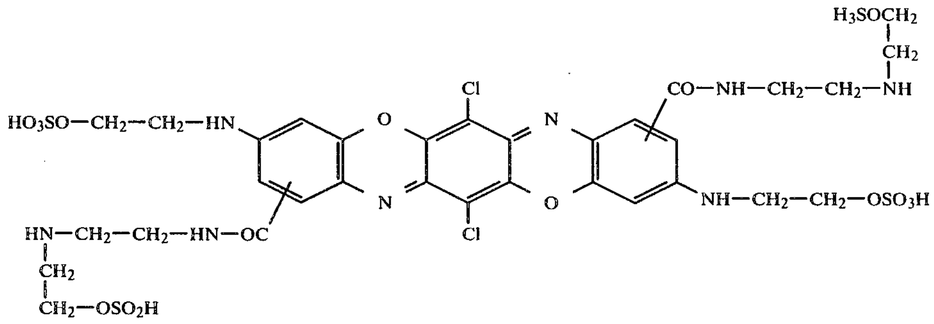 | 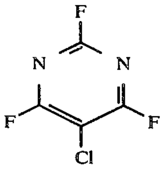 | |
| | 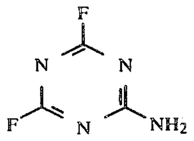 | |
| 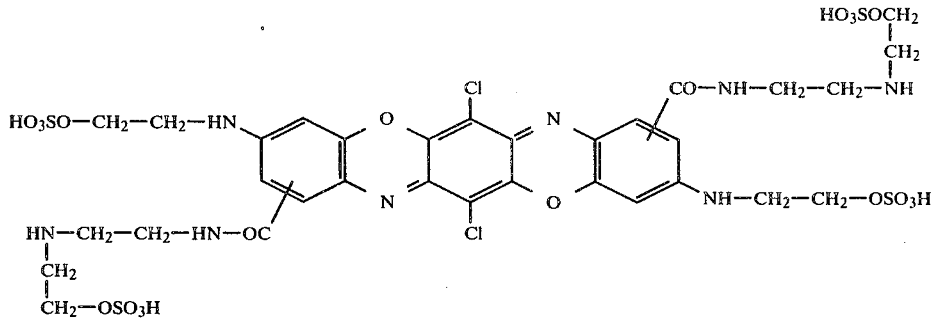 | 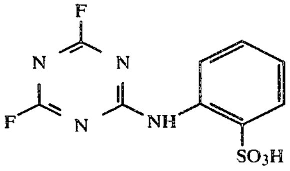 | |

-continued
| Dioxazine-carboxamide component | Reactive component | $\lambda_{max}$ in water |
|---|---|---|
| 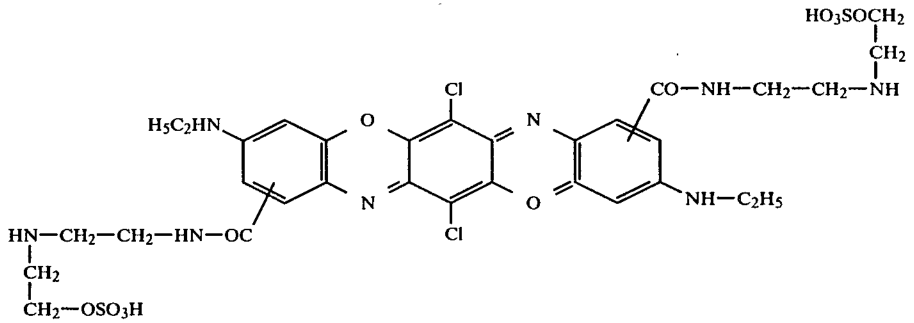 | 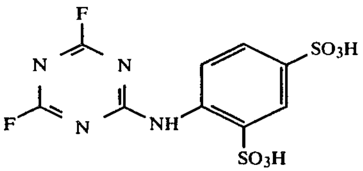 | |
| 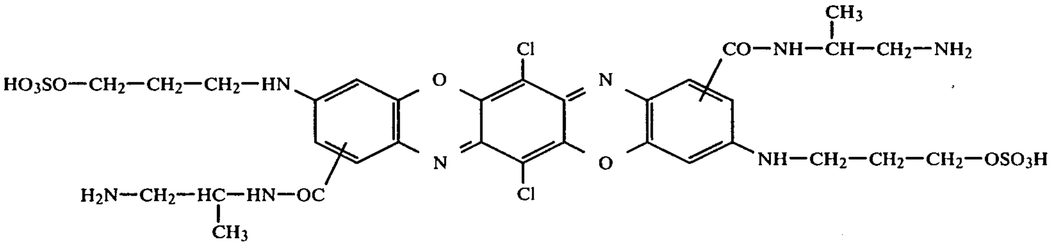 | 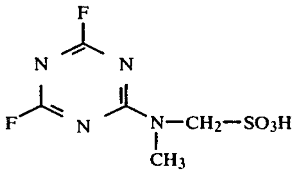 | |
| 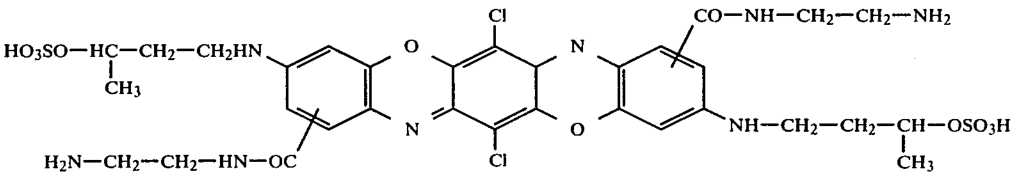 | 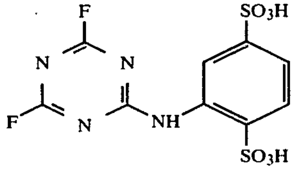 | |
| 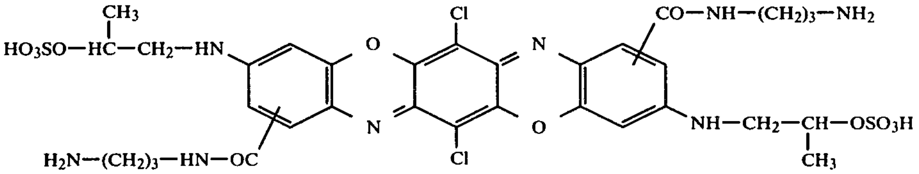 | 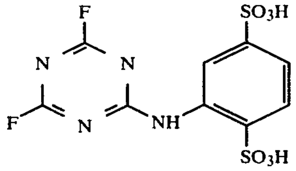 | |

-continued
| Dioxazine-carboxamide component | Reactive component | $\lambda_{max}$ in water |
|---|---|---|
| 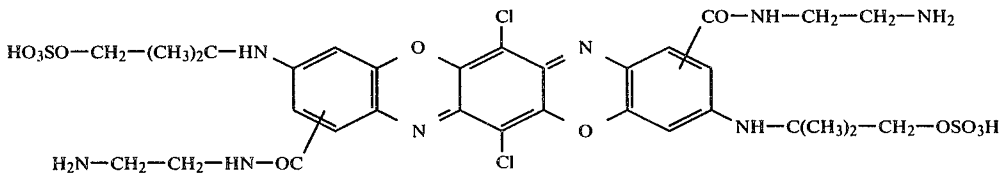 | 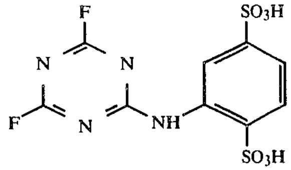 | |
| 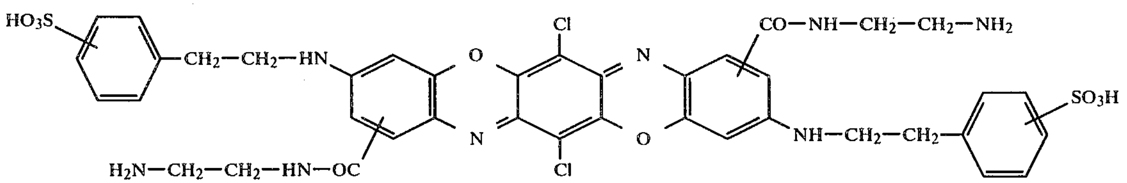 | 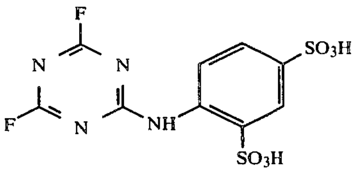 | |
| 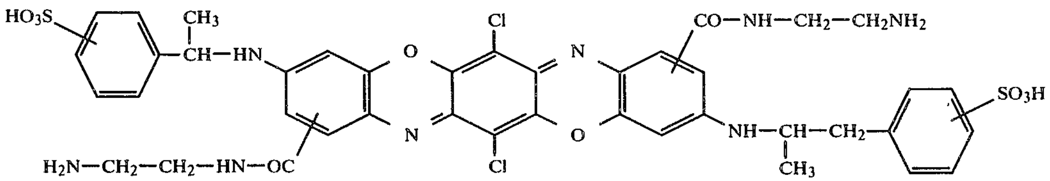 | 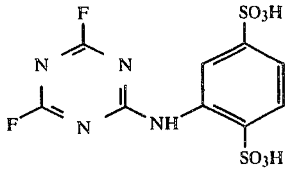 | |
| 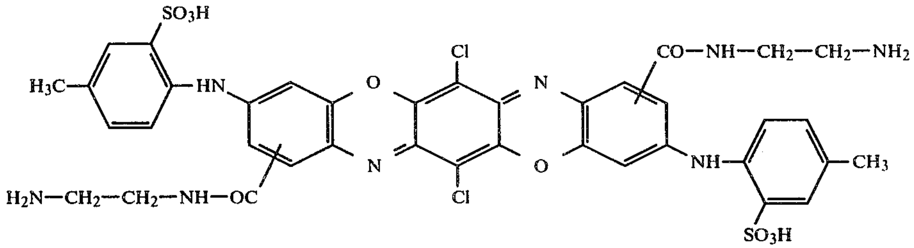 | 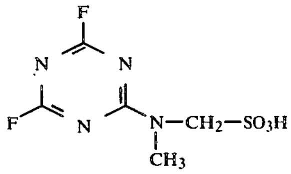 | |

-continued
| Dioxazine-carboxamide component | Reactive component | $\lambda_{max}$ in water |
|---|---|---|
| 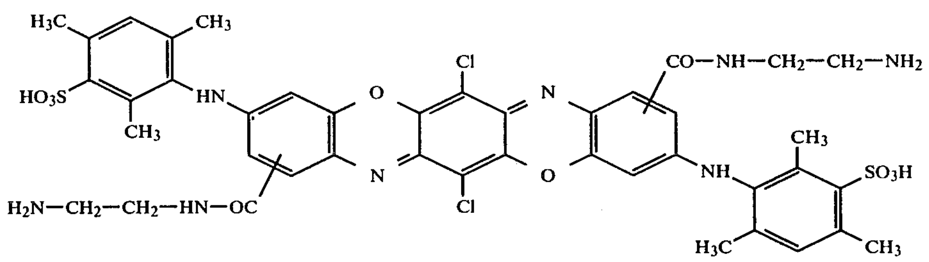 | 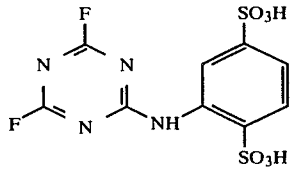 | |
| 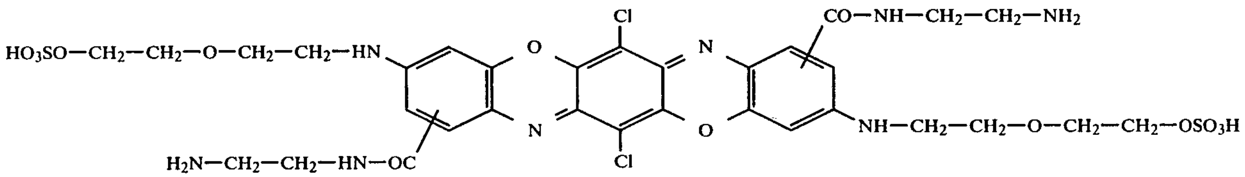 | 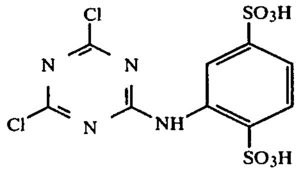 | |

EXAMPLE 2

7.5 g of 2-aminobenzenesulphonic acid are dissolved in 90 ml of water at pH 6-7. The pH value is brought to 5.0, 4.3 ml of cyanuric fluoride are added dropwise at 0°-5° C. in the course of 5 minutes and the pH value is kept at 4.5-4.7 with 5% strength sodium carbonate solution, partial precipitation of the condensation product occurring. To bring the condensation reaction to completion, the batch is subsequently stirred for a further 15-20 minutes under the above conditions.

11.2 g of a dioxazine-carboxamide component of the formula

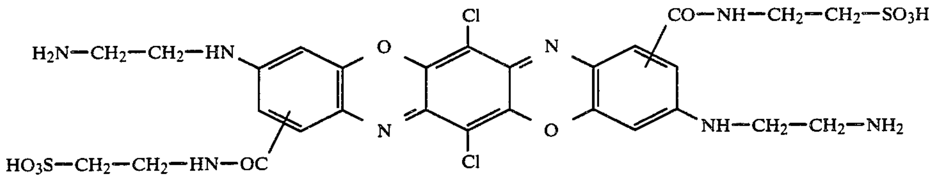

prepared by condensation of 5-amino-2-(β-aminoethylamino)-benzoic acid β-sulphoethylamide with chloranil and subsequent oxidative cyclisation in oleum, are dissolved in 200 ml of water at pH 12 by addition of 2N sodium hydroxide solution.

The solution of the colour component is now introduced at 0°-5° C. into the suspension of the reactive component prepared above, as rapidly as possible so that a pH value of 8.5-9.0 is established, and this pH value is then maintained by dropwise addition of 1N sodium hydroxide solution. Stirring is continued at 0°-5°. The colour component which has initially partially precipitated soon dissolves completely as the reaction progresses.

After some hours, the temperature is allowed to rise to 20° C. overnight, with continuous control of the pH, the pH value is brought to 7.5-8.0 and the resulting reactive dyestuff is salted out with 15-20% of sodium chloride. The resulting precipitate is filtered off with suction and the filter cake is washed with sodium chloride solution and, after addition of phosphates as a buffer, is dried at 50° C. in a vacuum cabinet. An alternative method of working up comprises evaporating the dyestuff solution to dryness in a rotary evaporator, after addition of phosphate buffers. In both cases, a blue powder is obtained, the colouring substance of which is the sodium salt of the dyestuff of the following formula

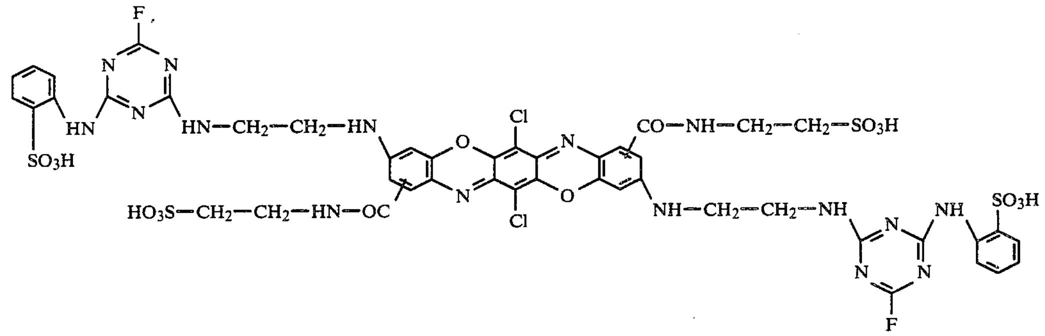

The dyestuff dyes and prints cellulose fibres by the known dyeing and printing techniques in clear, strong blue shades.

The following summary shows dioxazine-carboxamide components, from which further reactive dyestuffs which dye and print cellulose fibres in a strong blue shade can be prepared with the reactive components mentioned, the number of reactive components which can be employed not being limited to the examples given. ($\lambda_{max}$ in water: 602 nm).

| Dioxazine-carboxamide component | Reactive component | λmax in water |
| --- | --- | --- |
| 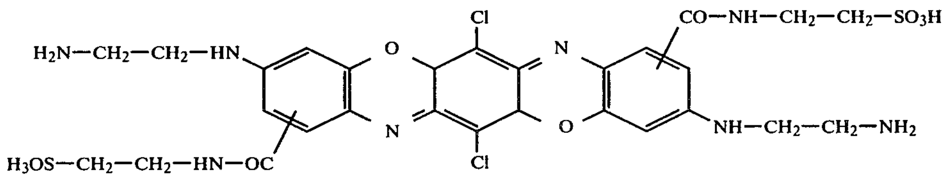 | 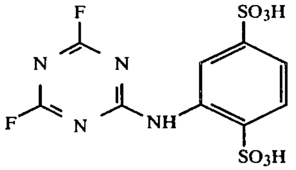 | 603 nm |
| 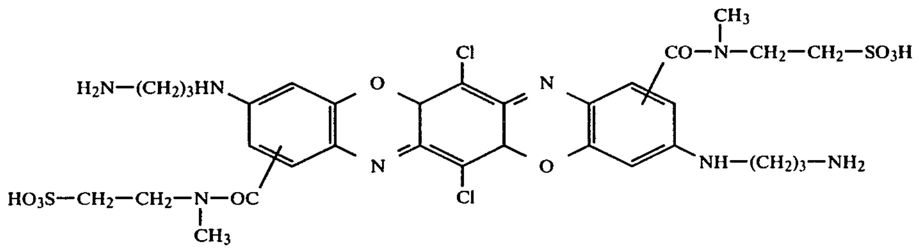 | 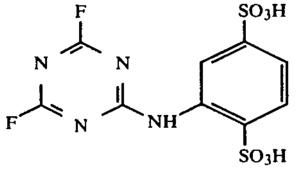 | 619 nm |
| 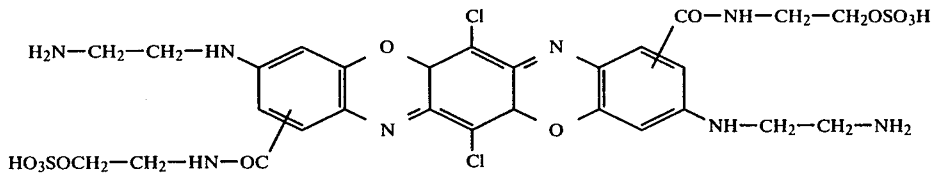 | 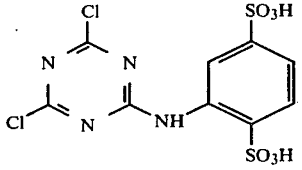 | 618 nm |
| 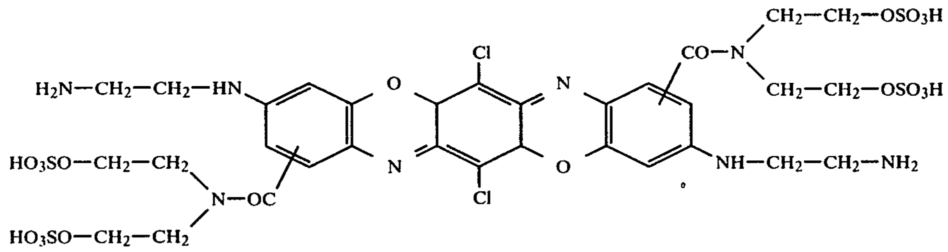 | 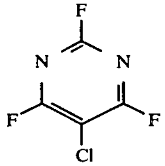 | |

-continued
| Dioxazine-carboxamide component | Reactive component | λmax in water |
|---|---|---|
| 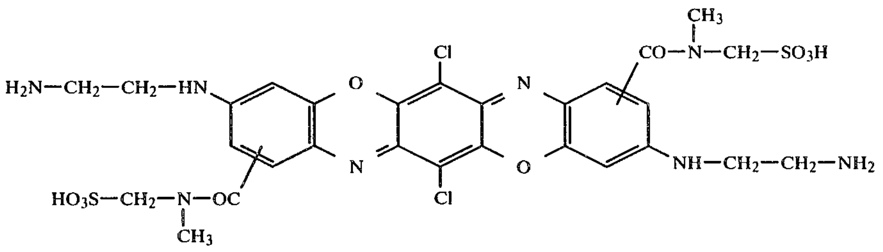 | 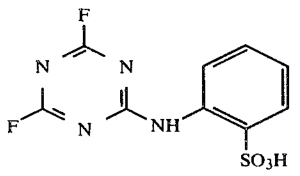 | |
| 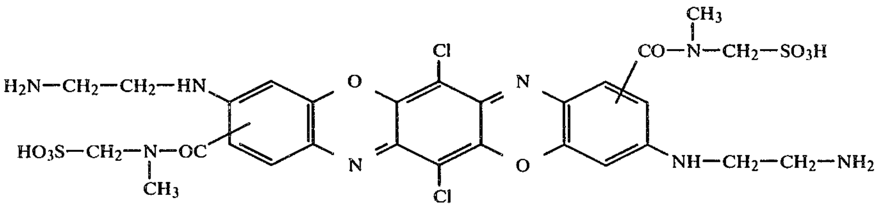 | 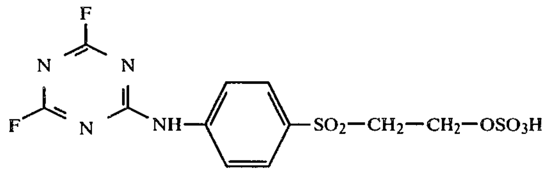 | |
| 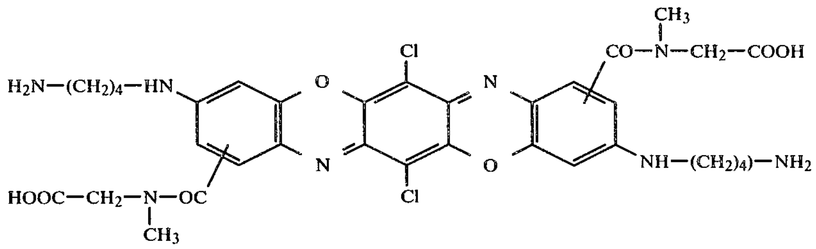 | 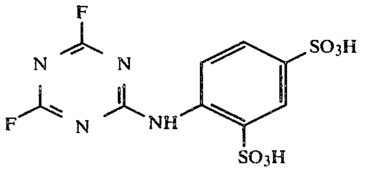 | 617 nm |
| 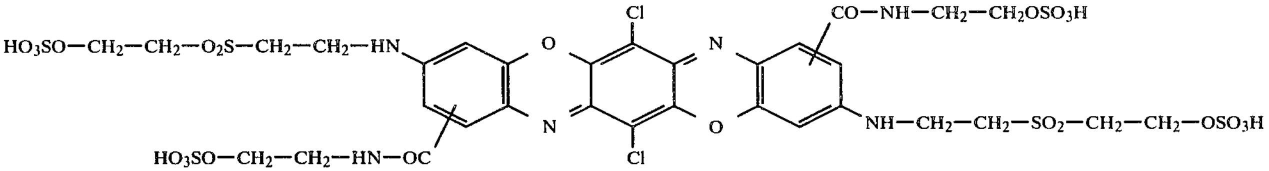 | | |

-continued
| Dioxazine-carboxamide component | Reactive component | λmax in water |
|---|---|---|
| 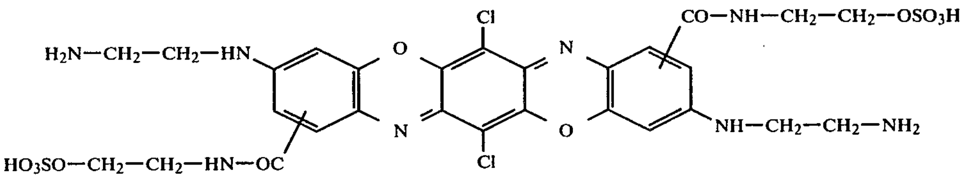 | 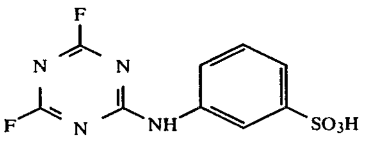 | |
| 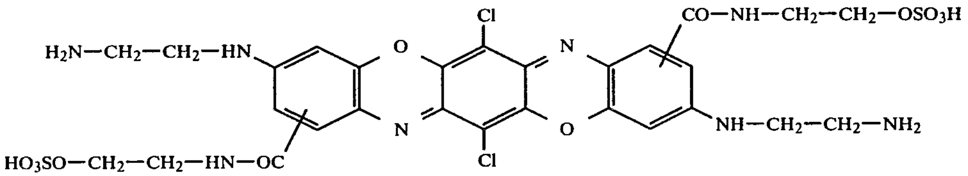 | 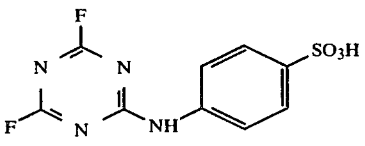 | |
| 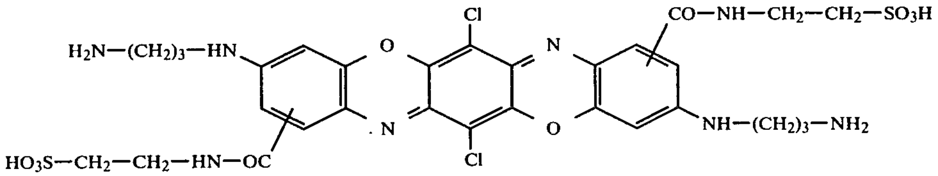 | 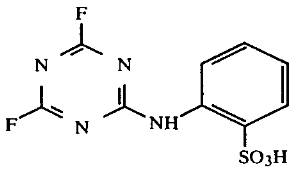 | |
| 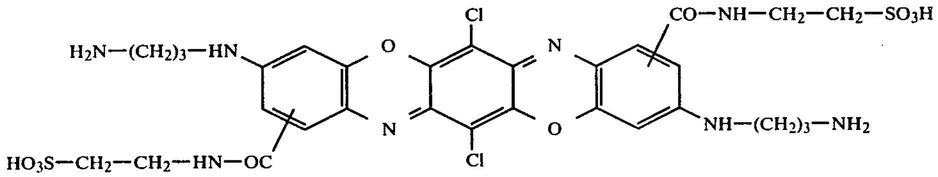 | 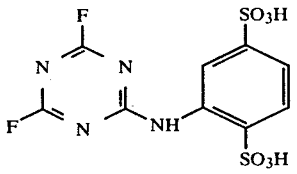 | |
| 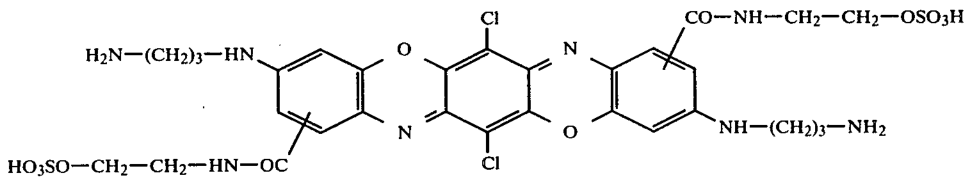 | 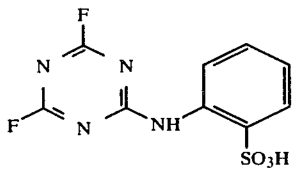 | |

-continued
| Dioxazine-carboxamide component | Reactive component | λmax in water |
|---|---|---|
| 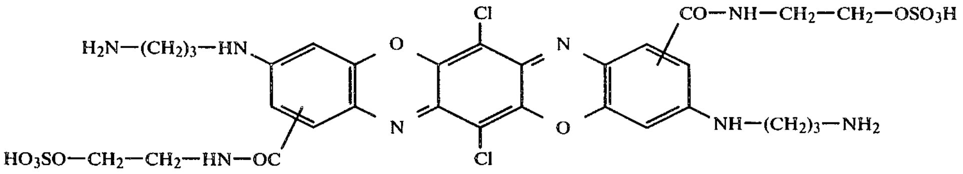 | 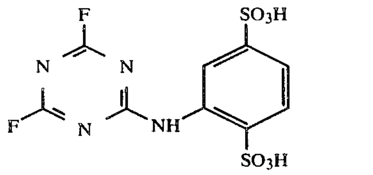 | |
| 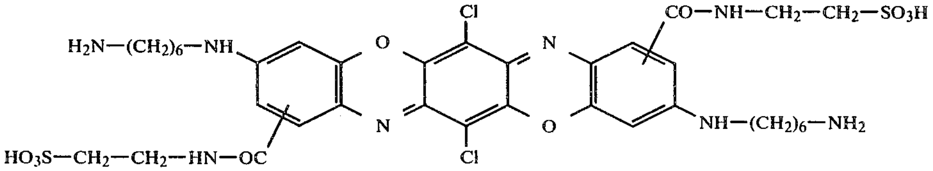 | 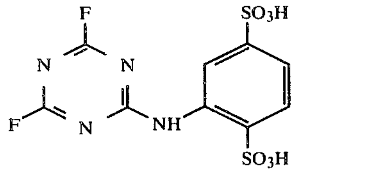 | |
| 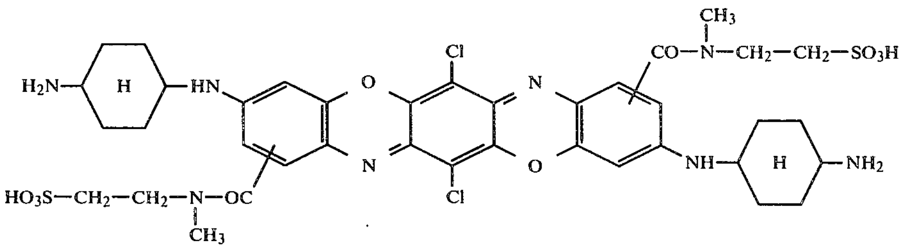 | 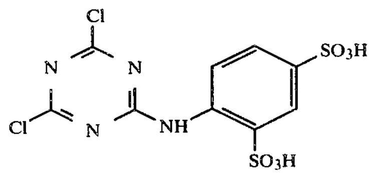 | |
| 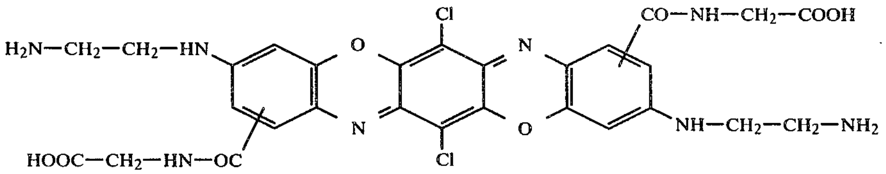 | 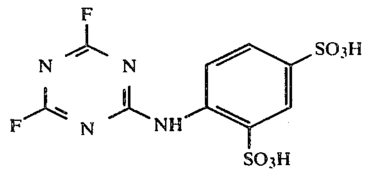 | |

-continued
| Dioxazine-carboxamide component | Reactive component | λmax in water |
|---|---|---|
| 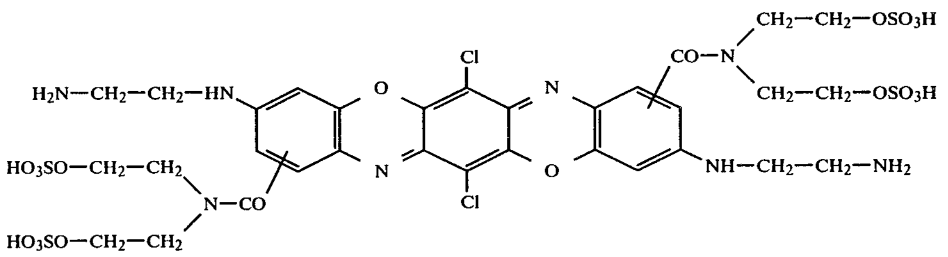 | 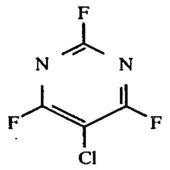 | |
| 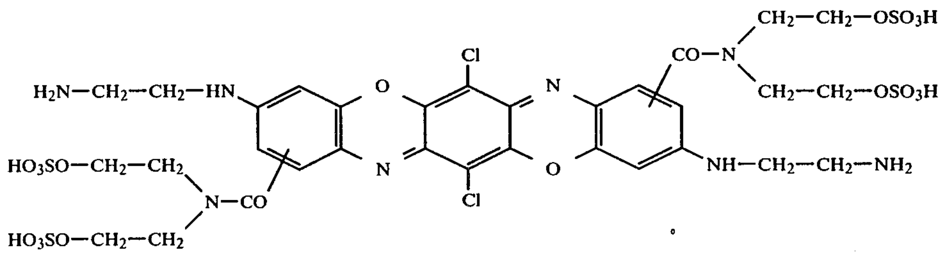 | 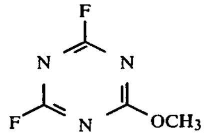 | |
| 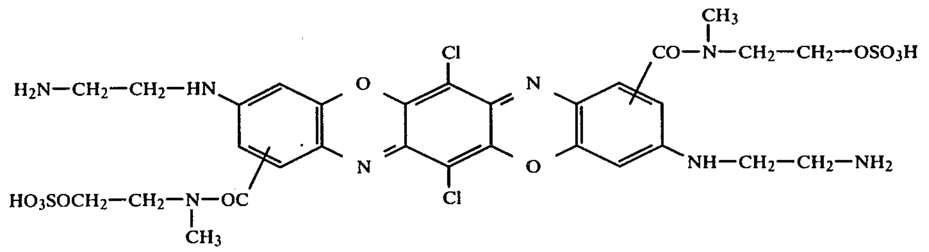 | 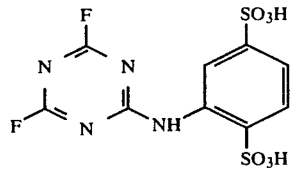 | 617 nm |
| 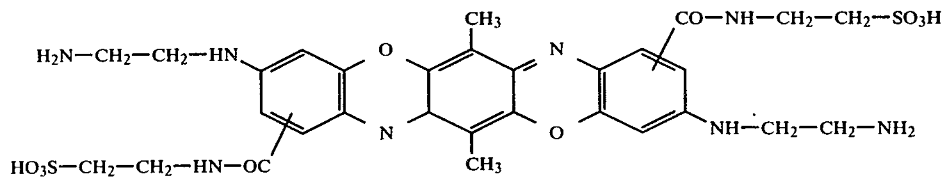 | 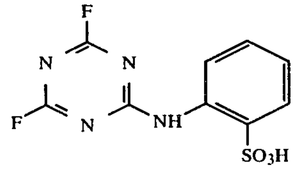 | |

-continued
| Dioxazine-carboxamide component | Reactive component | λmax in water |
|---|---|---|
| 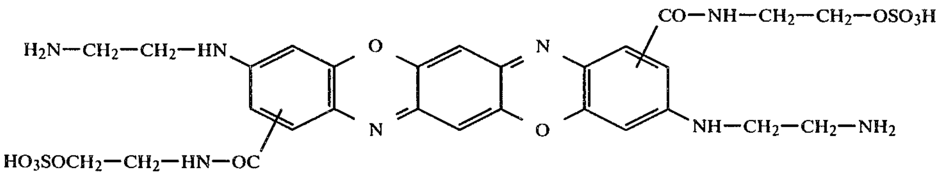 | 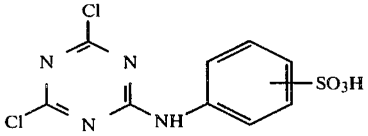 | m:p = 1:1 |
| 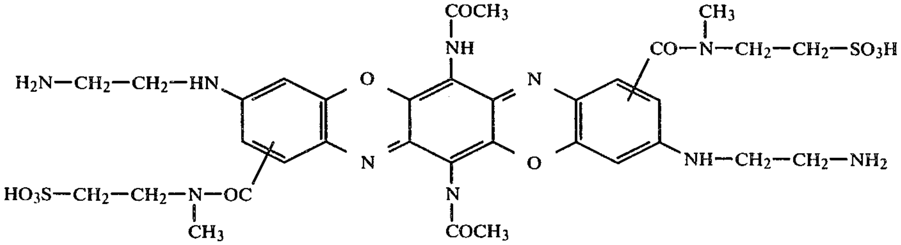 | 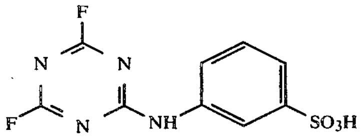 | |
| 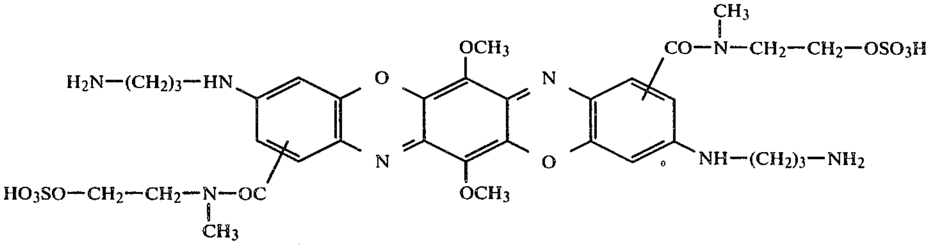 | 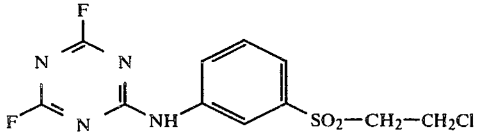 | |
| 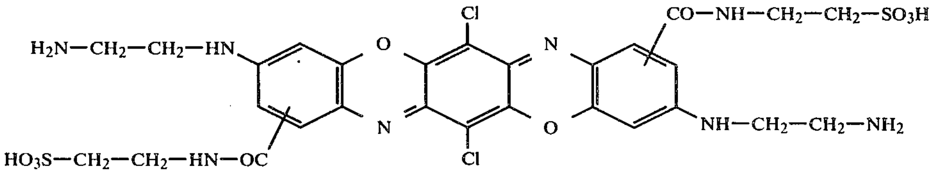 | 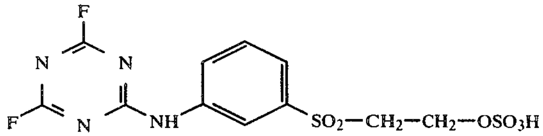 | |

-continued
| Dioxazine-carboxamide component | Reactive component | λmax in water |
|---|---|---|
| 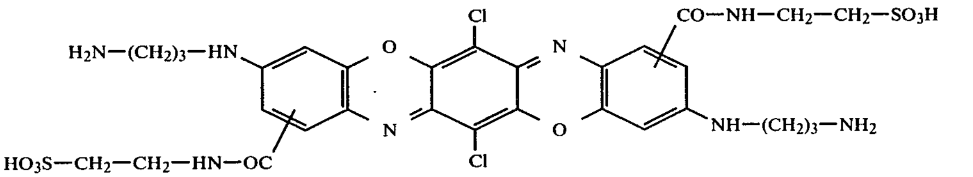 | 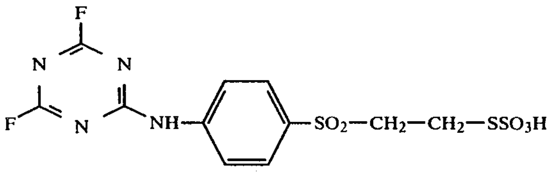 | |
| 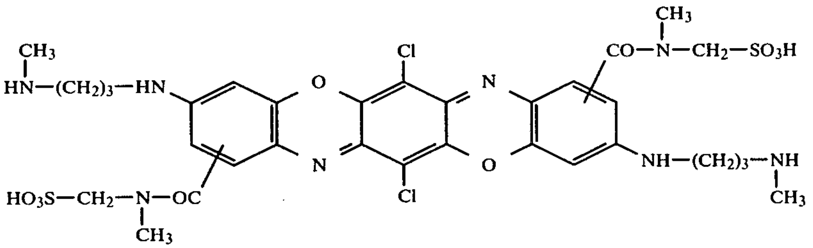 | 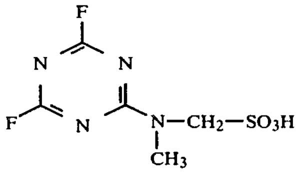 | |
| 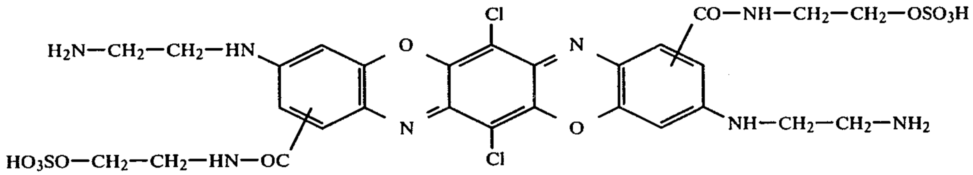 | 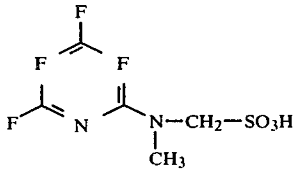 | |
| 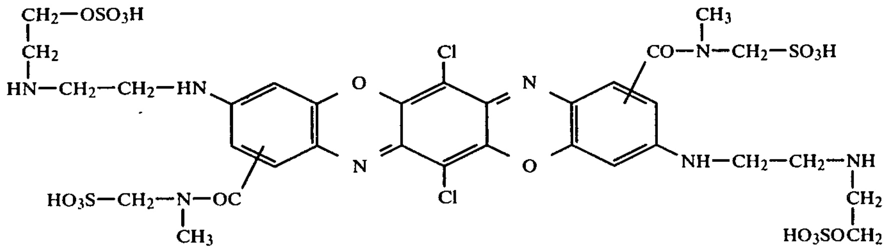 | 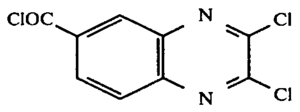 | |

-continued
| Dioxazine-carboxamide component | Reactive component | λmax in water |
|---|---|---|
| 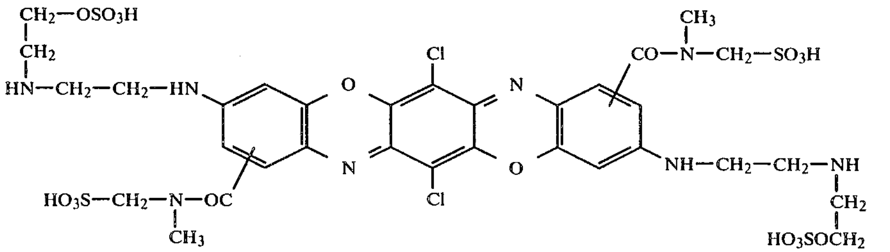 | 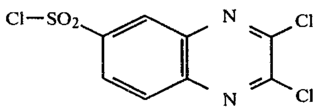 | |
| 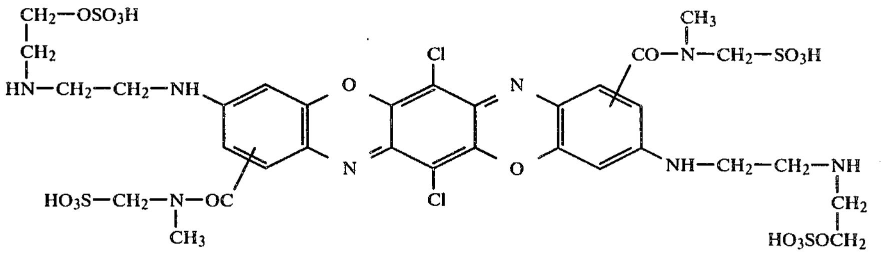 | 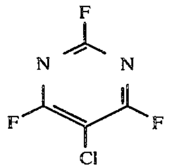 | |
| 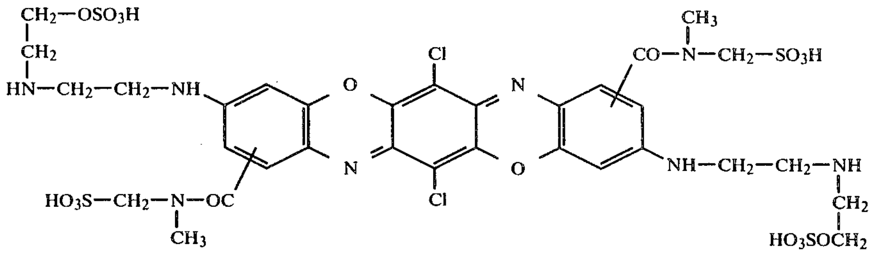 | 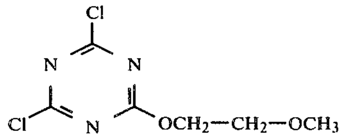 | |
| 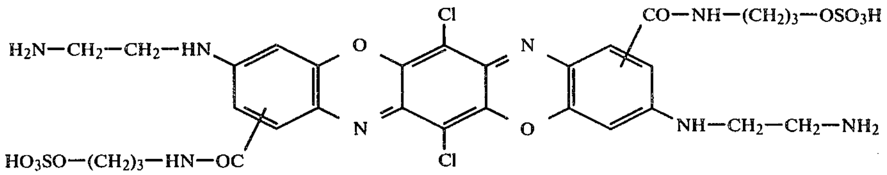 | 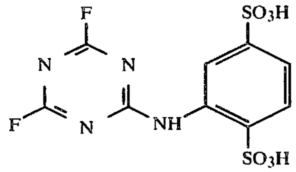 | |

-continued
| Dioxazine-carboxamide component | Reactive component | λmax in water |
|---|---|---|
| 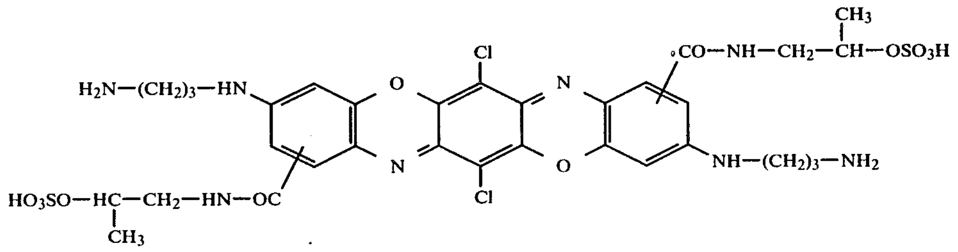 | 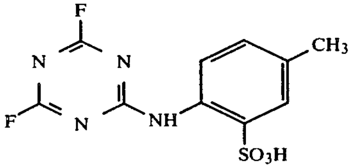 | |
| 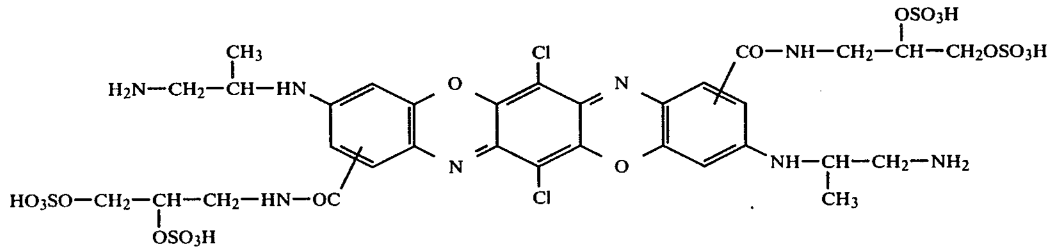 | 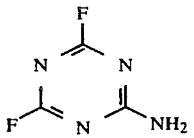 | |
| 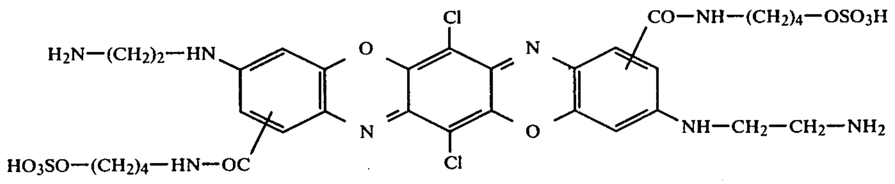 | 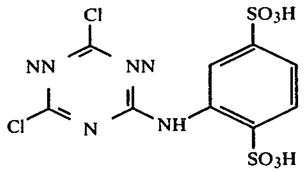 | |
| 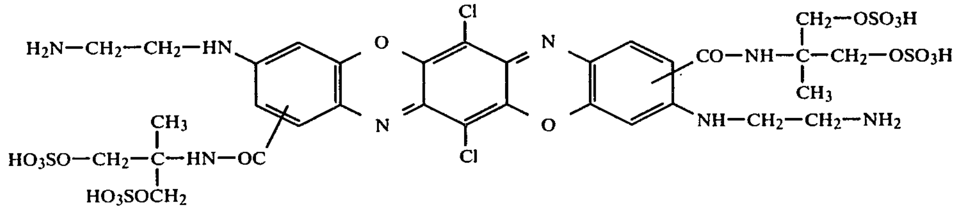 | 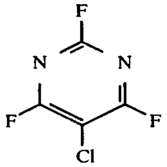 | |

-continued
| Dioxazine-carboxamide component | Reactive component | λmax in water |
| --- | --- | --- |
| 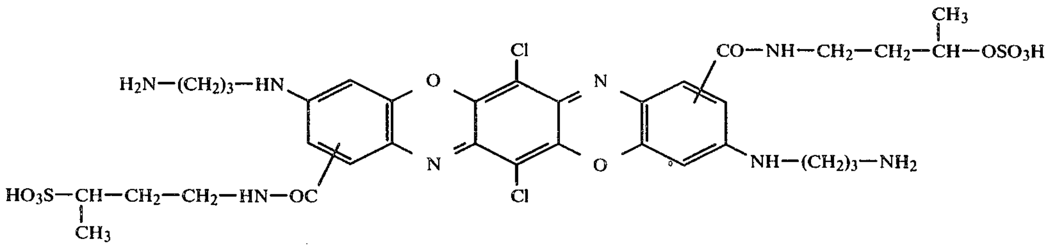 | 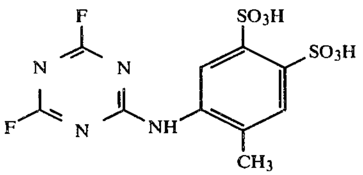 | |
| 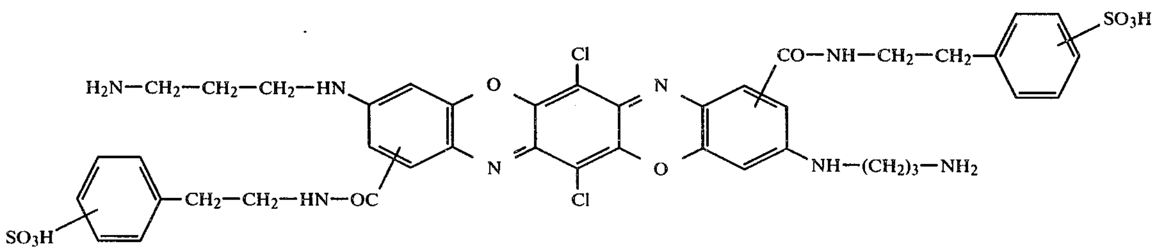 | 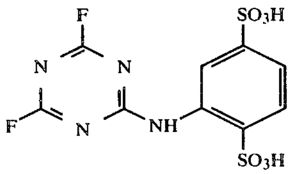 | |
| 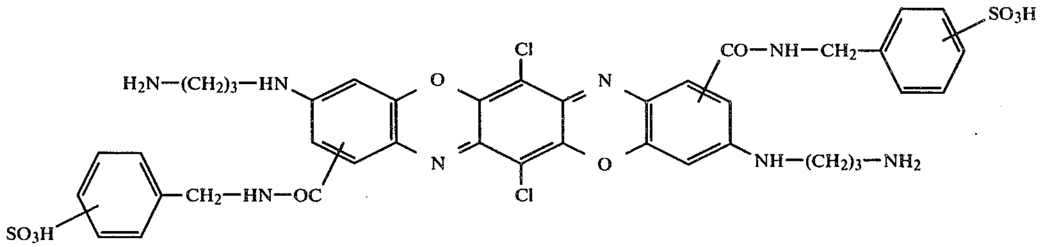 | 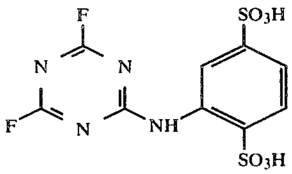 | |

-continued
| Dioxazine-carboxamide component | Reactive component | λmax in water |
| --- | --- | --- |
| 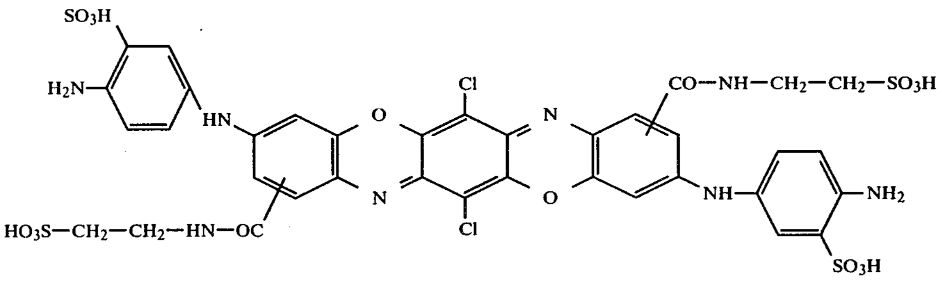 | (1.) 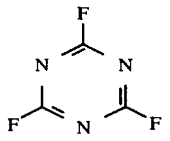 (2.) 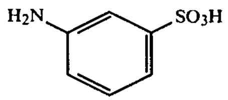 | |
| 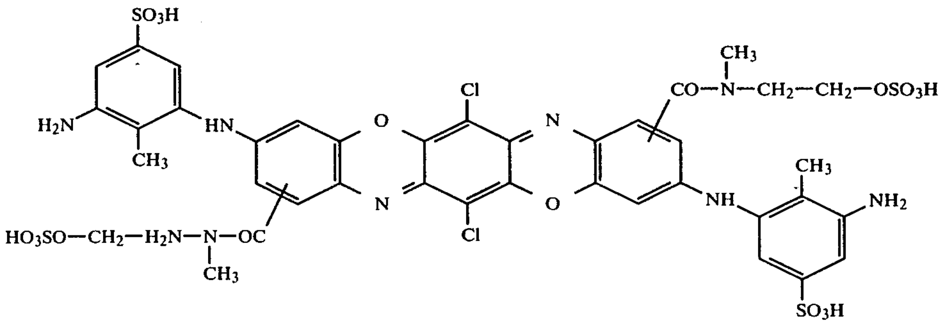 | 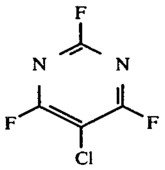 | |
| 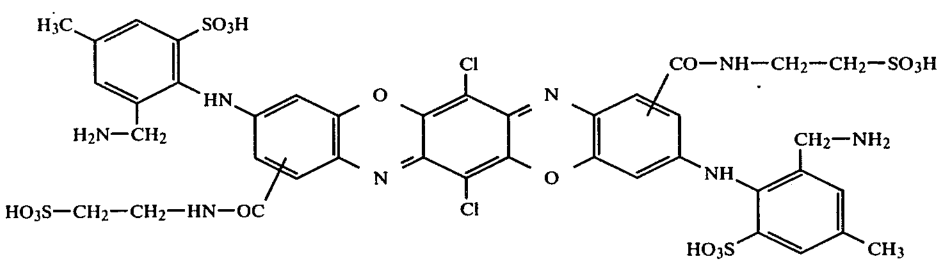 | 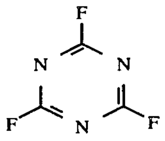 | |

-continued
| Dioxazine-carboxamide component | Reactive component | λmax in water |
| --- | --- | --- |
| 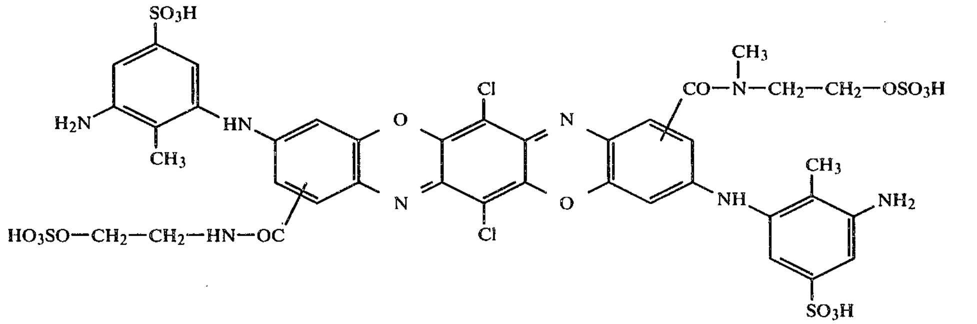 | 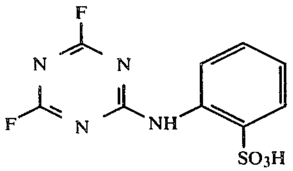 | |
| 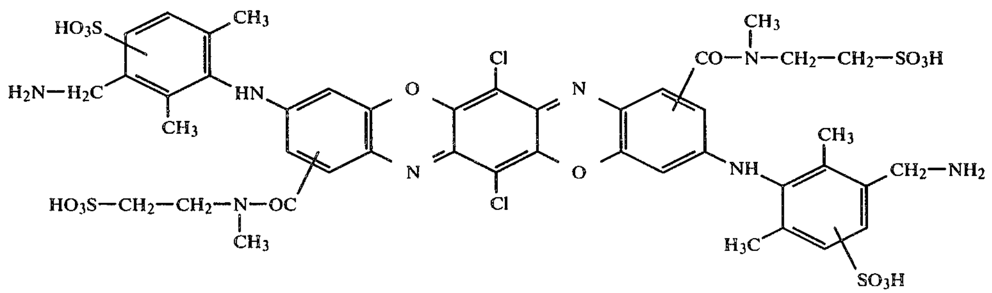 | 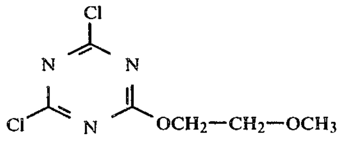 | |
| 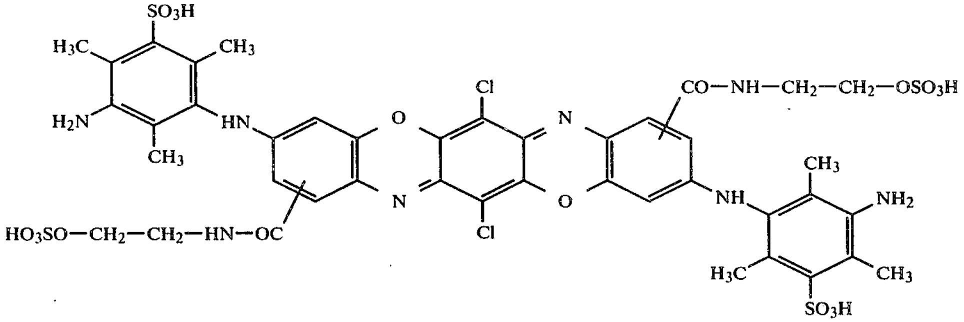 | 1. 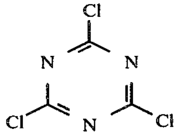 2. 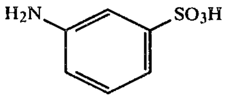 | |

EXAMPLE 3

12.7 g of a dioxazine-carboxamide component of the formula

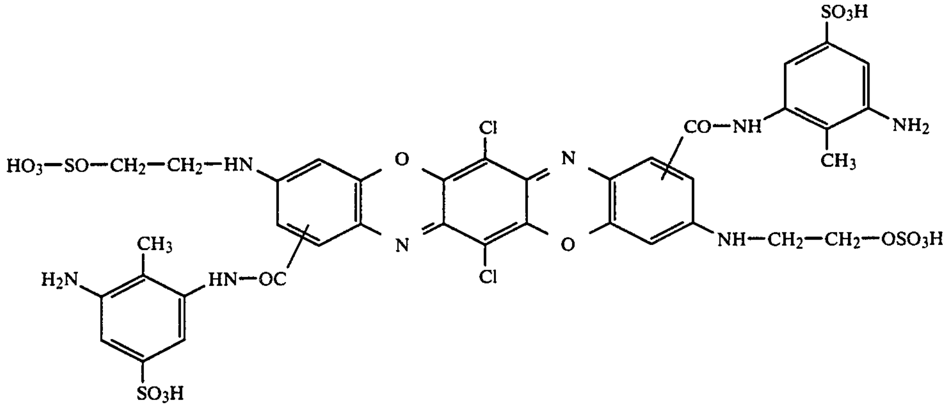

prepared by condensation of chloranil with 5-amino-2-β-hydroxyethylamino-benzoic acid 3'-amino-2-methyl-5'-sulphophenyl-amide and oxidative cyclisation of the condensation product in oleum, are dissolved in 180 ml of water, the pH value being brought to 6.0 with dilute sodium hydroxide solution. 3.7 ml of 2,4,6-trifluoro-5-chloropyrimidine are now added dropwise at 20° C. in the course of 30 minutes, and the pH value is kept at 5.5–6.0 with 2N sodium carbonate solution. To bring the condensation reaction to completion, stirring is continued under the same pH and temperature conditions for several hours and the reactive dyestuff formed is then salted out with about 20% of sodium chloride. The precipitate is filtered off with suction, washed with sodium chloride solution and dried at 50° C. in a circulating air cabinet.

The dyestuff obtained as the sodium salt corresponds, in the form of the free acid, to the formula

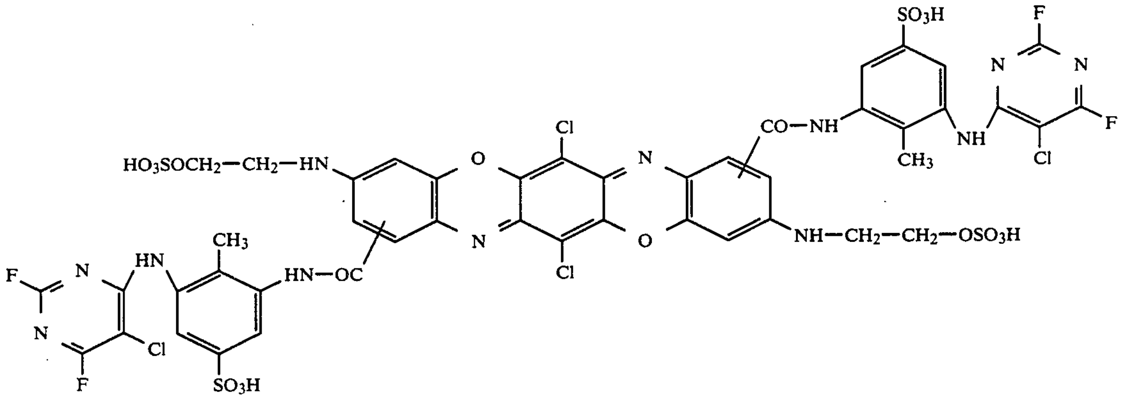

and dyes cellulose fibres by the technique of the customary dyeing and printing processes in clear blue shades. ($\lambda_{max}$ in water: 584 nm).

EXAMPLE 4

16.7 g of a dioxazine-carboxamide component of the formula

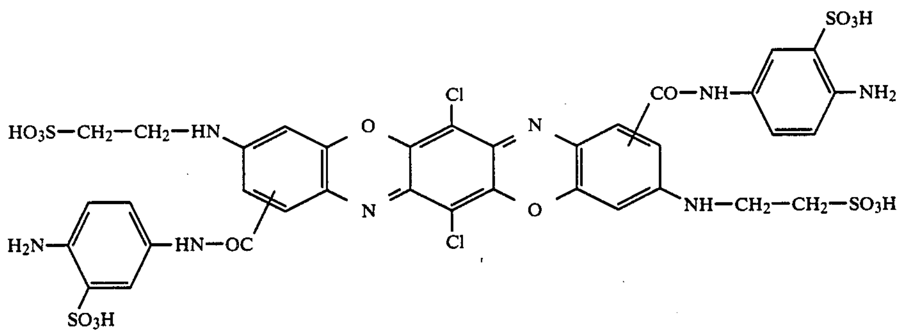

prepared by condensation of chloranil with 5-amino-2-(β-sulphoethylamino)-benzoic acid 4'-amino-3-sulphophenylamide and oxidative cyclisation of the condensation product in oleum, are dissolved in 300 ml of water at pH 5.5. The solution is cooled to 0°–5° C. and 3.7 ml of cyanuric fluoride are added dropwise in the course of 5 minutes. During the dropwise addition of the cyanuric fluoride and for about 20 minutes thereafter, the pH value in the reaction mixture is kept at 4.5–4.8 by means of 1N sodium carbonate solution. When the condensation reaction has ended, a neutralised solution of 8.0 g of 3-aminobenzenesulphonic acid in 80 ml of water is then allowed to run in. The pH value is now kept at 6.0–6.5 with sodium carbonate solution. After about 3 hours, the temperature is allowed to rise to 20° and, when the reaction has ended, the solution of the resulting dyestuff is saturated with sodium chloride or potassium chloride at 20°. The dyestuff precipitated is filtered off with suction, washed with 25% strength sodium chloride solution or potassium chloride solution and, after admixing with phosphate buffer, is dried in vacuo at 45° C. The resulting dyestuff corresponds, in the form of the free acid, to the formula

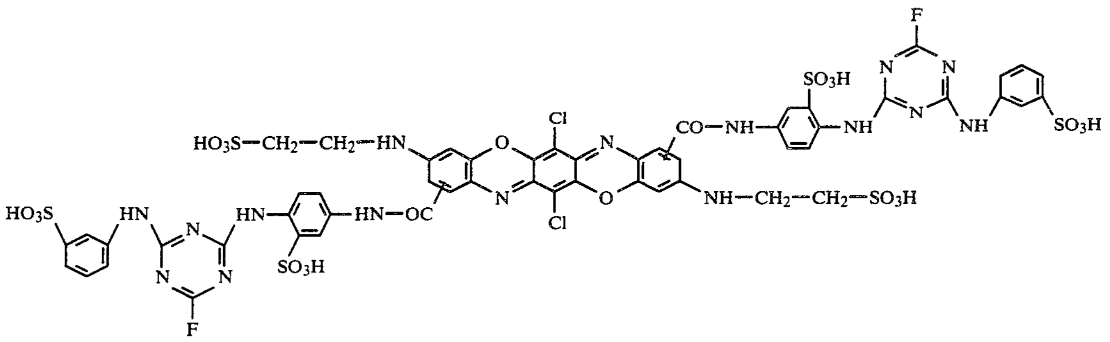

Clear, blue dyeings and prints can be produced on cellulose fibres with this dyestuff using the known techniques.

If the dioxazine-carboxamide components shown in the following summary are reacted with the reactive components indicated, further blue reactive dyestuffs are obtained, with which cellulose fibres can be dyed and printed in blue colour shades which are fast to wet processing. ($\lambda_{max}$ in water: 584 nm).

| Dioxazine-carboxamide component | Reactive component |
| --- | --- |
| 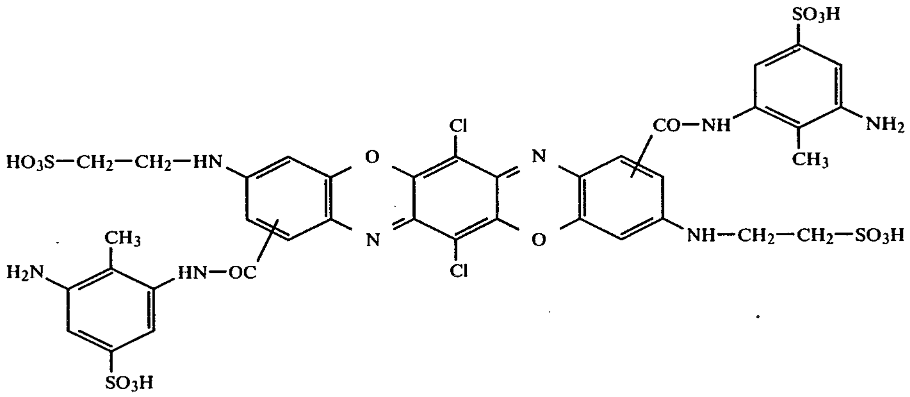 | 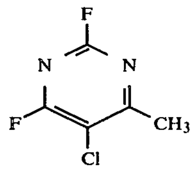 |
| 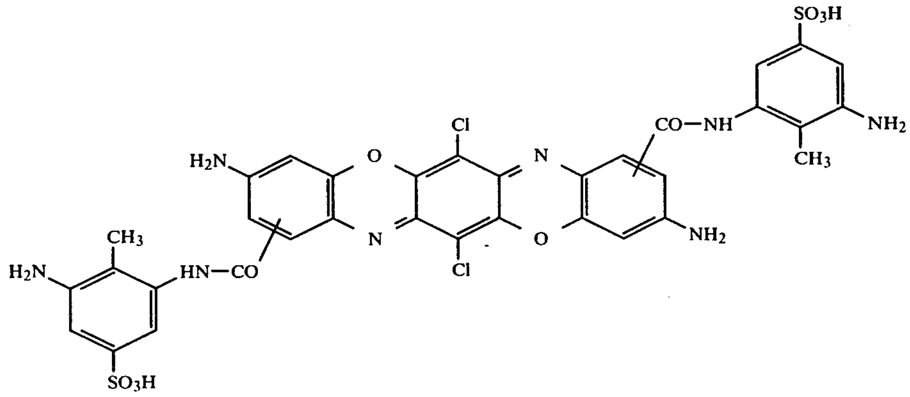 | 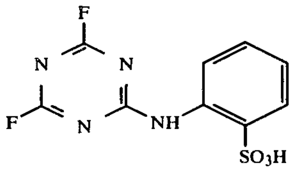 |

-continued
| Dioxazine-carboxamide component | Reactive component |
| --- | --- |
| 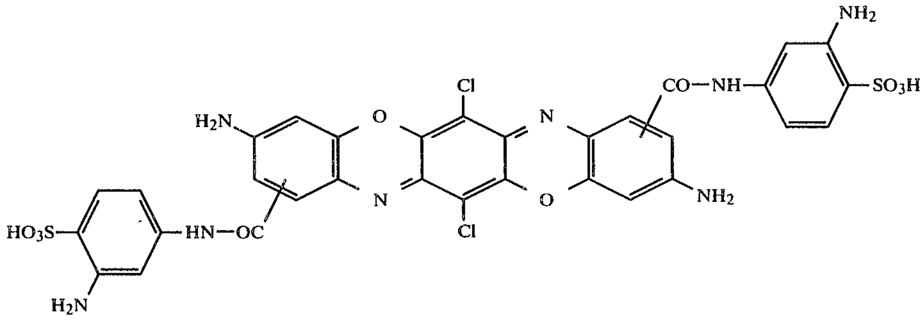 | 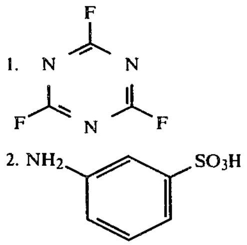 |
| 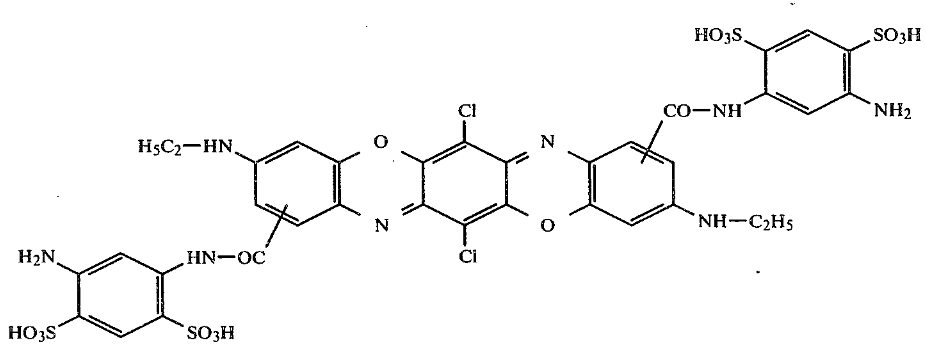 | 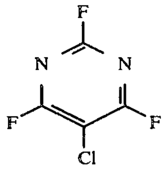 |
| 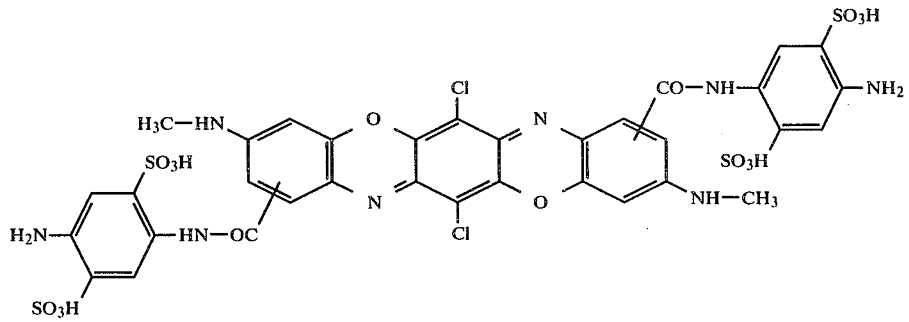 | 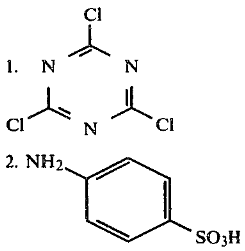 |

-continued
| Dioxazine-carboxamide component | Reactive component |
| --- | --- |
| 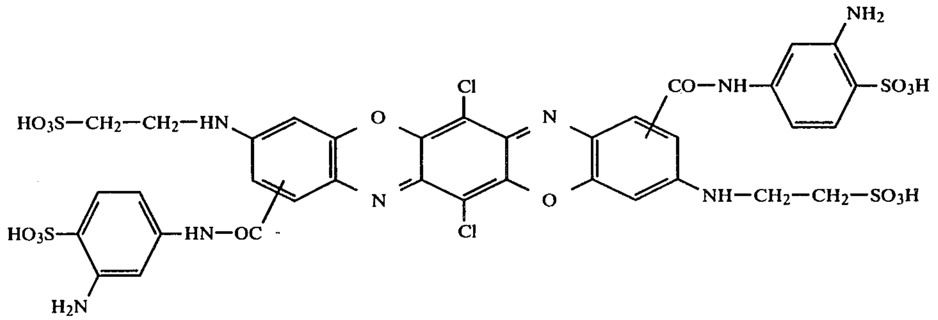 | 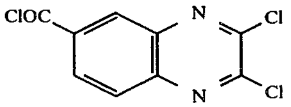 |
| 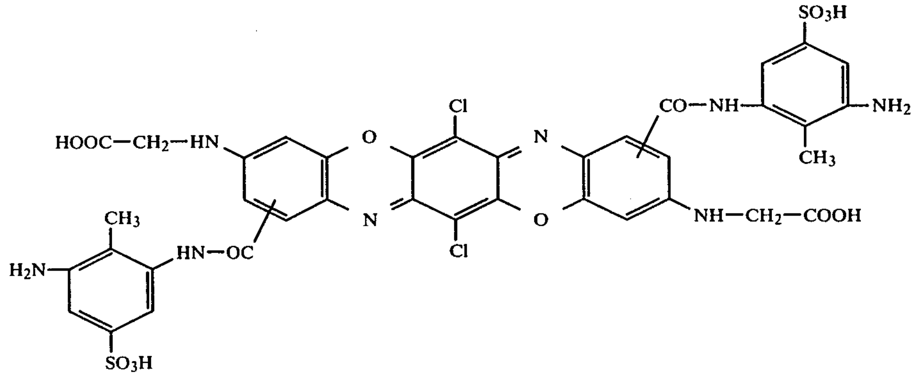 | 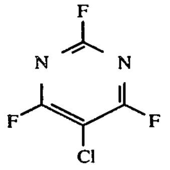 |
| 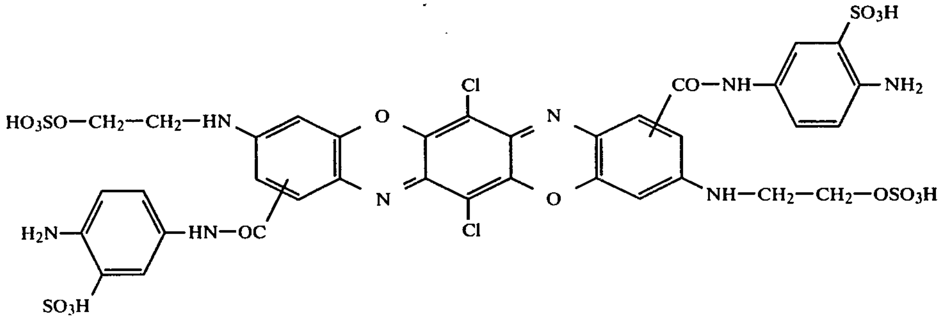 | 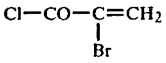 |

-continued
| Dioxazine-carboxamide component | Reactive component |
| --- | --- |
| 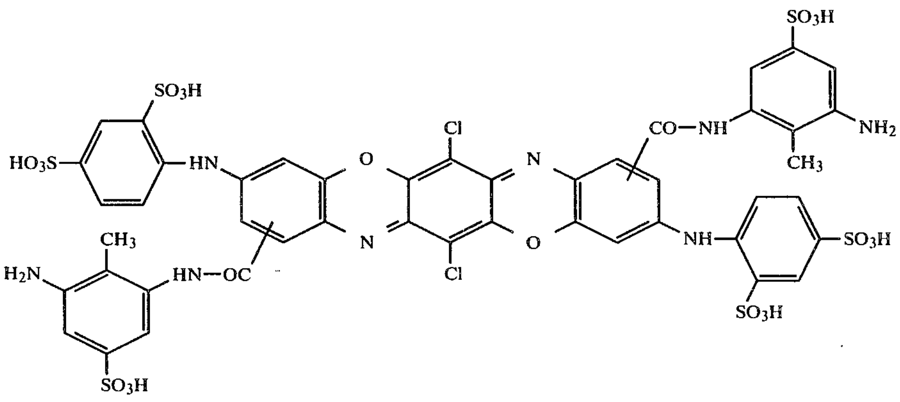 | 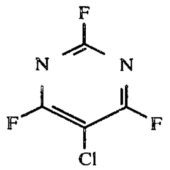 |
| 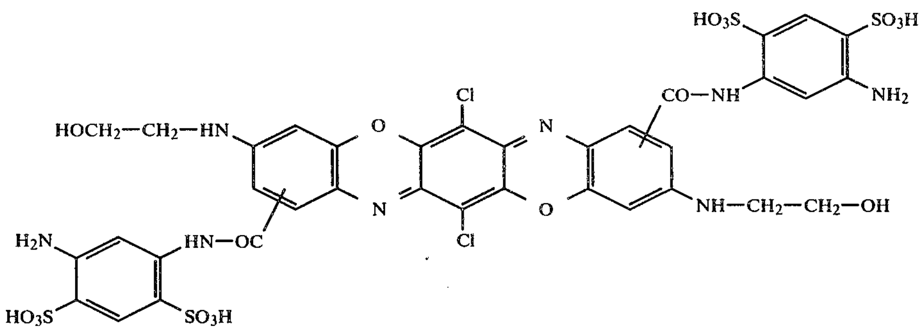 | 1. 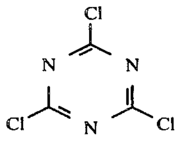 2. 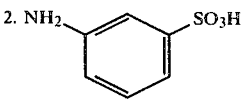 |

-continued
| Dioxazine-carboxamide component | Reactive component |
|---|---|
| 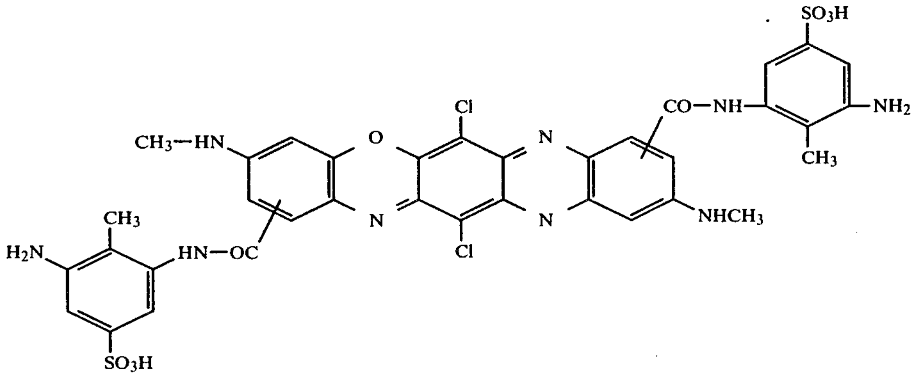 | 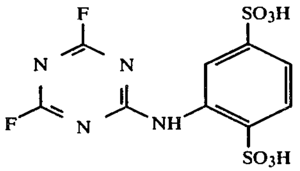 |
| 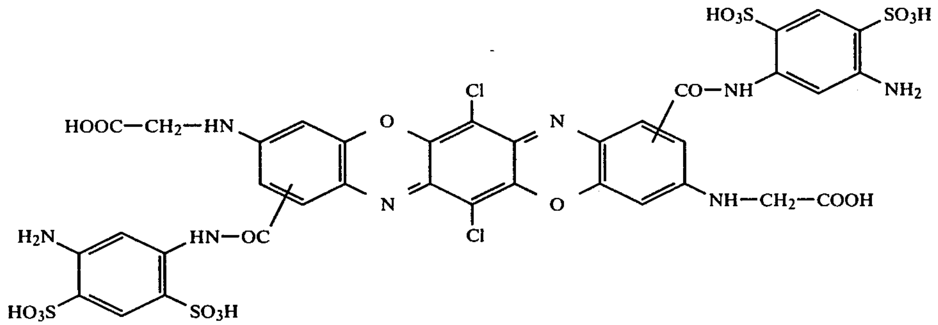 | 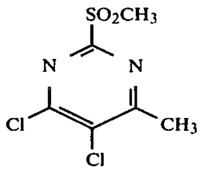 |
| 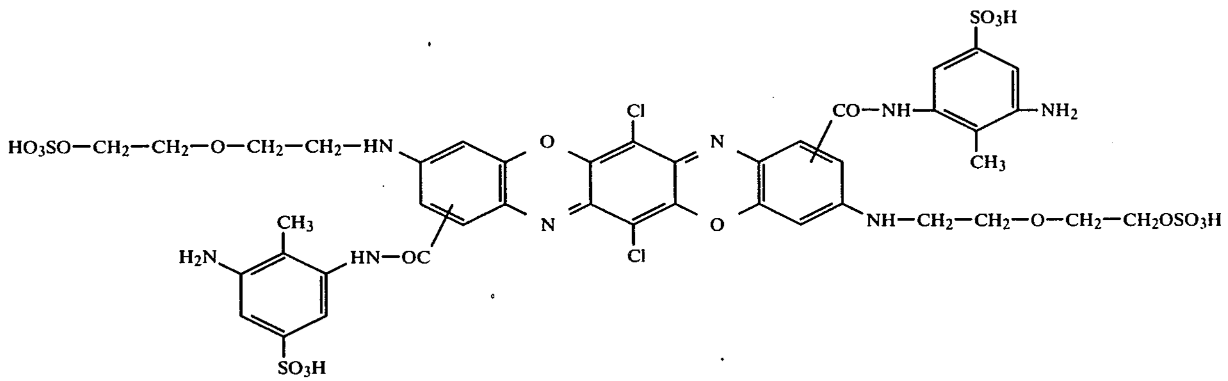 | 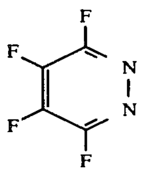 |

EXAMPLE 5

If 16.4 g of a dioxazine-carboxamide of the formula

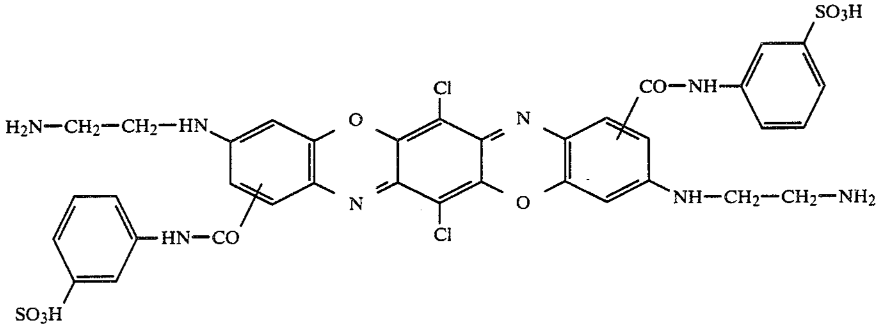

dissolved at pH 12 in 400 ml of water, are employed instead of the tauride compound described in Example 2, and this solution is subjected to a condensation reaction with difluorotriazinyl-aminobenzene-1,4-disulphonic acid, which has been prepared from 14.4 g of 2-aminobenzene-1,4-disulphonic acid and 5.7 ml of cyanuric fluoride in the manner described in Example 1, working up and drying gives a dyestuff of the formula

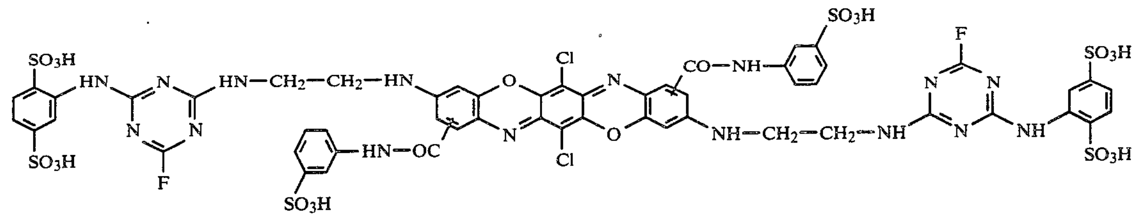

which produces clear blue dyeings and prints on cotton and viscose staple by the customary application techniques for reactive dyestuffs.

Further similar dyestuffs are obtained by reacting the dioxazine-carboxamide components and reactive components shown in the following summary. ($\lambda_{max}$ in water: 622 nm).

| Dioxazine-carboxamide component | Reactive component |
| --- | --- |
| 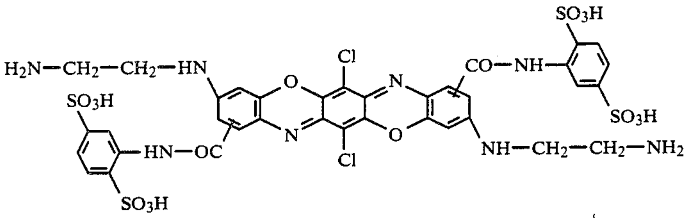 | 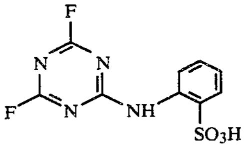 |
| 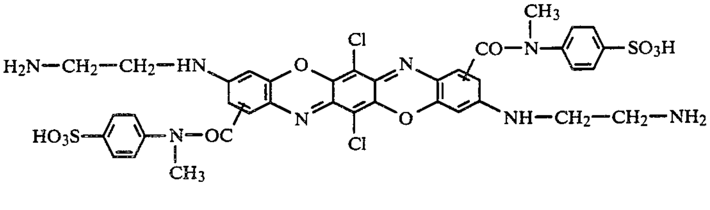 | 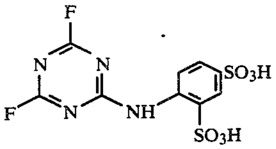 |
| 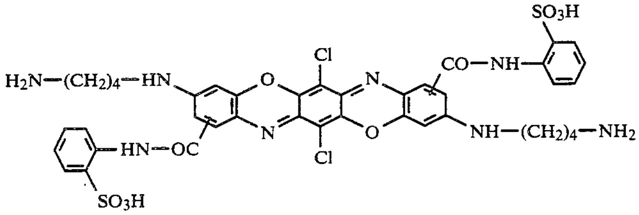 | 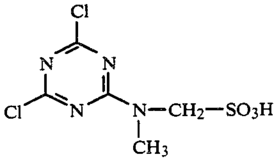 |

-continued

| Dioxazine-carboxamide component | Reactive component |
| --- | --- |
| 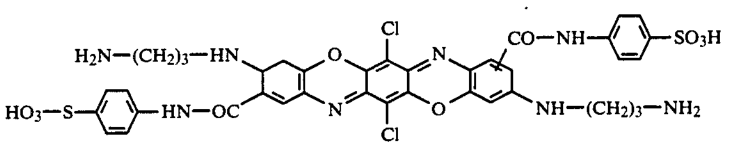 | 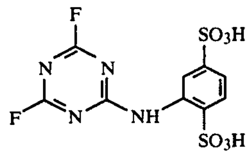 |

EXAMPLE 6

11.7 g of a dioxazine-carboxamide component of the formula

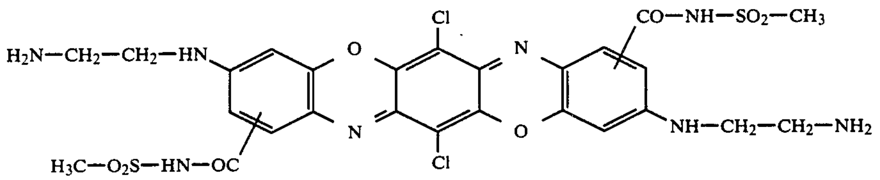

are dissolved in 300 ml of water at pH 12.

This solution is reacted in the manner described in Example 2 with difluorotriazinylaminobenzene-2-sulphonic acid, which has been prepared from 8.5 g of 2-aminobenzenesulphonic acid and 4.9 ml of cyanuric fluoride. After working up of the solution, a dyestuff of the formula

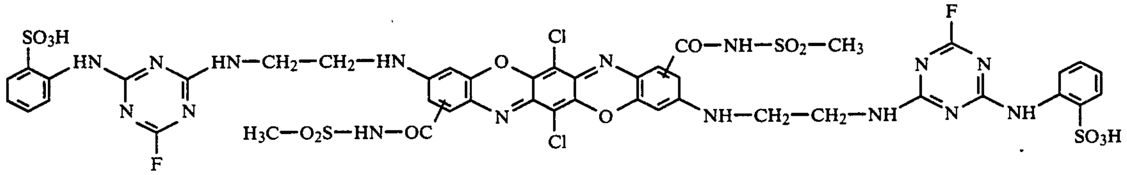

which is suitable for dyeing and printing cellulose fibres in blue shades, is obtained.

EXAMPLE 7

A product similar to the dyestuff of Example 6 is obtained if, instead of the methylsulphonylcarboxamide component, 13.8 g of the following phenylsulphonylcarboxamide component are dissolved in 300 ml of water, this solution is reacted with the condensation product of 12.6 g of 2-aminobenzene-1,4-disulphonic acid and 5.0 ml of cyanuric fluoride in accordance with the statements of the example, and the procedure is otherwise in accordance with the statements of Example 1. The dyestuff thus obtained corresponds to the formula

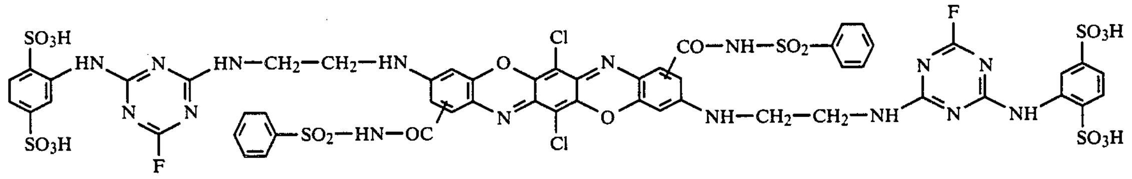

It produces clear blue dyeings and prints on cellulose fibres.

Further dyesfuffs of this type are obtained by subjecting the sulphonylcarboxamides and reactive components shown below to a condensation reaction.

| Dioxazine-sulphonylcarboxamide | Reactive component |
| --- | --- |
| 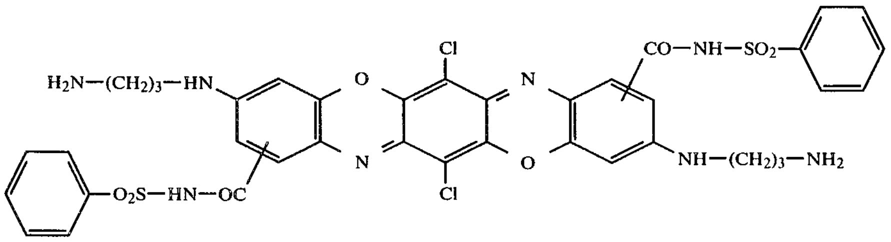 | 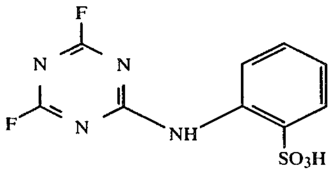 |
| 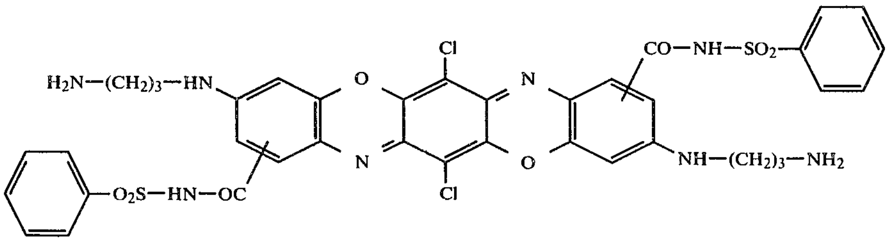 | 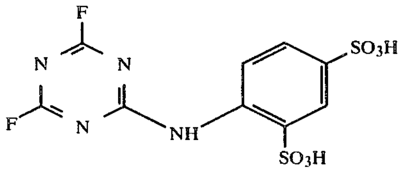 |
| 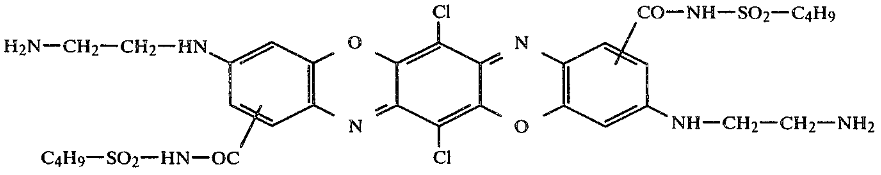 | 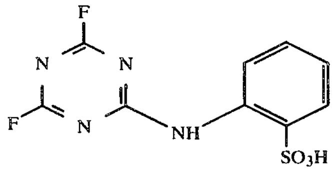 |
| 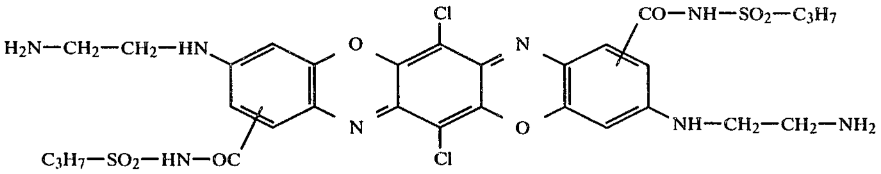 | 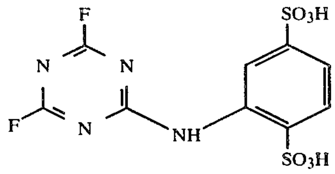 |

-continued
| Dioxazine-sulphonylcarboxamide | Reactive component |
| --- | --- |
| 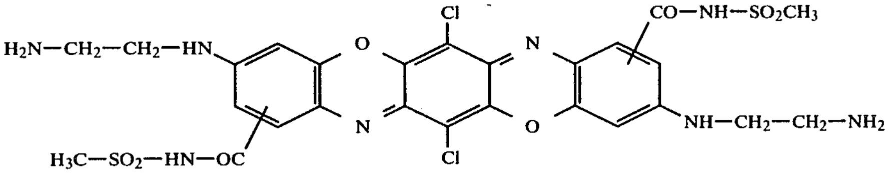 | 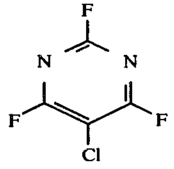 |
| 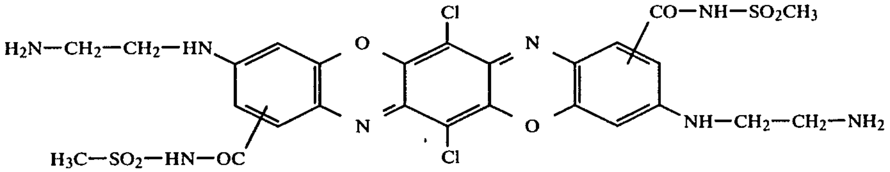 | 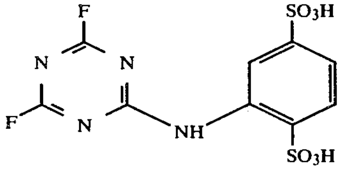 |
| 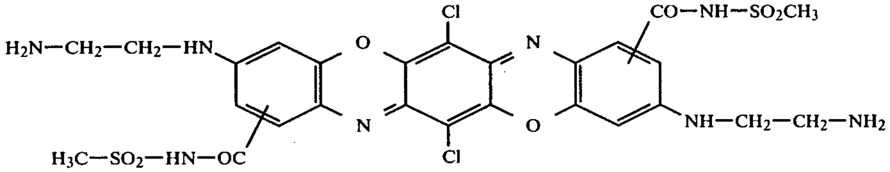 | 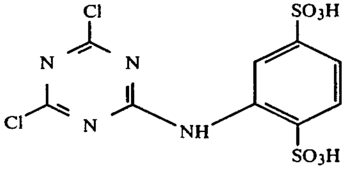 |

EXAMPLE 8

9.9 g of a dioxazine-carboxamide component of the formula

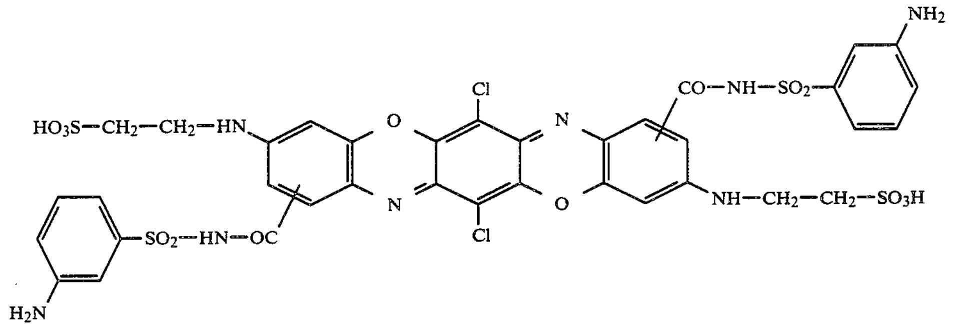

are dissolved in 200 ml of water at pH 7. 2.4 ml of 2,4,6-trifluoro-5-chloropyrimidine are added dropwise and the pH value is kept at 6.5. When the condensation has ended, the dyestuff is salted out and dried. It corresponds to the formula

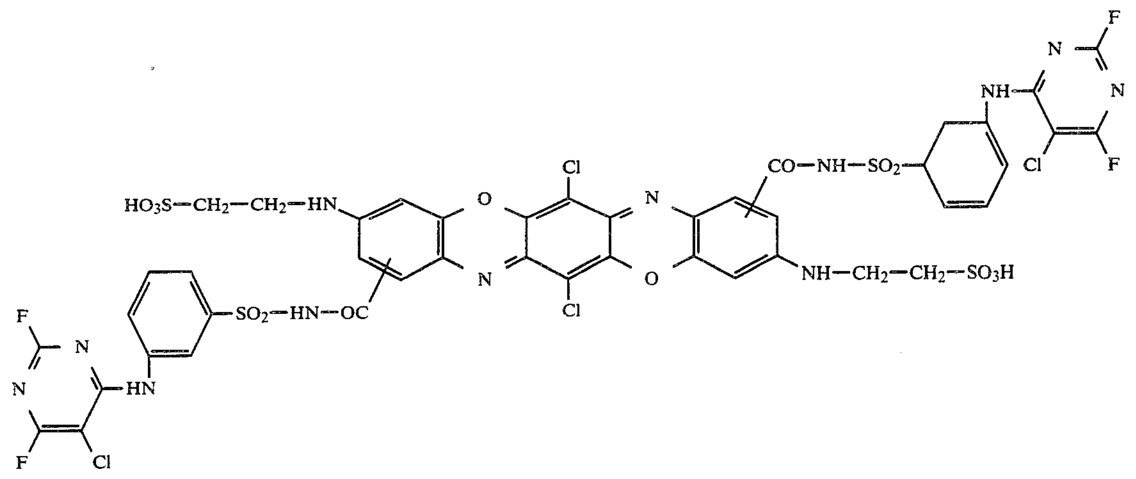

and produces blue dyeings and prints on cotton by the usual application techniques.

Further similar blue dyestuffs of this type are obtained by reacting the dioxazine components and reactive components described in the following summary.

| Dioxazine-carboxamide component | Reactive component |
| --- | --- |
| 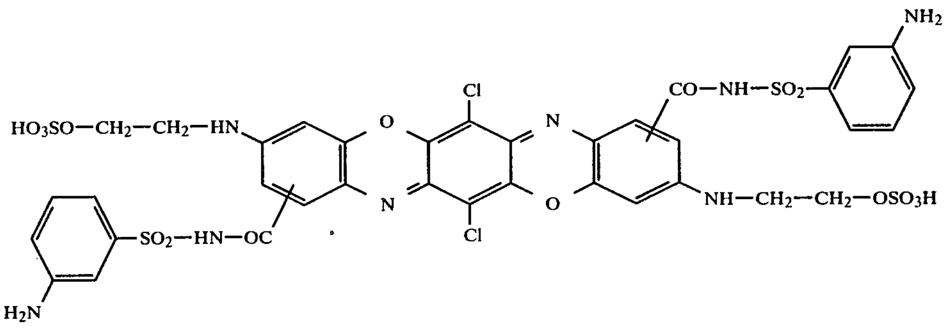 | 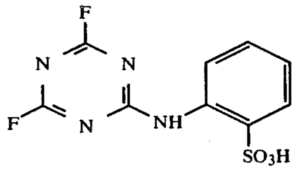 |
| 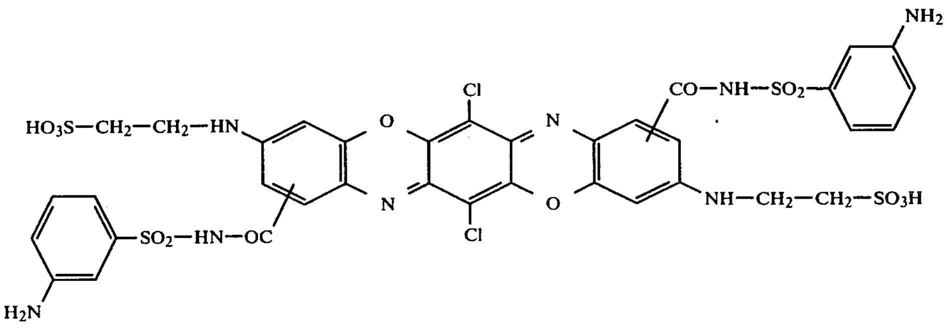 | 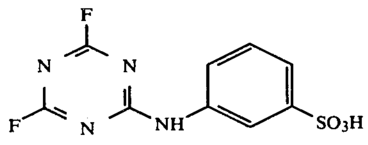 |
| 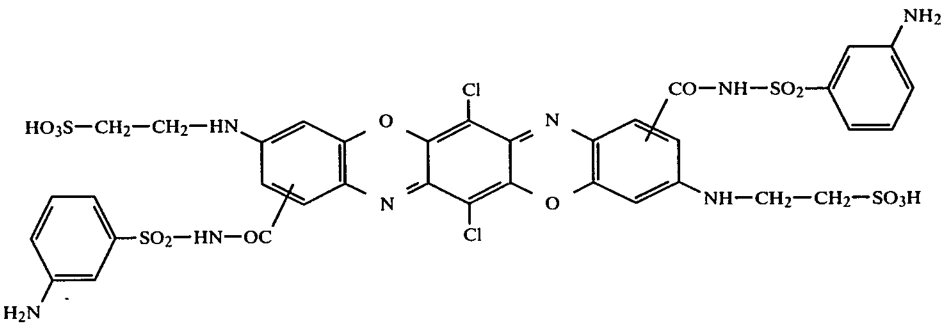 | 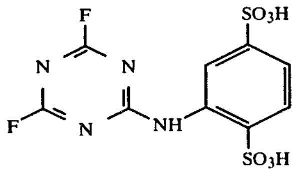 |

-continued
| Dioxazine-carboxamide component | Reactive component |
| --- | --- |
| 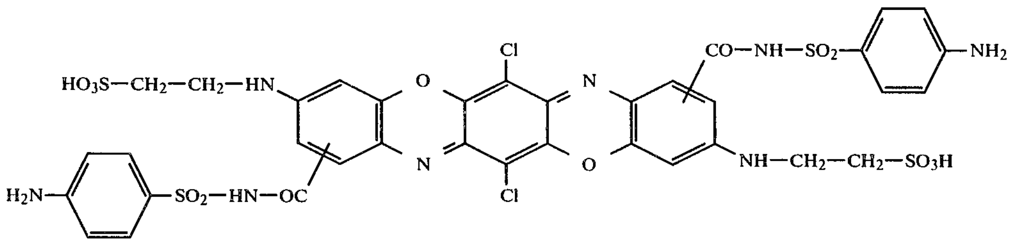 | 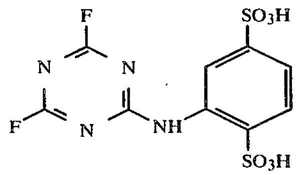 |
| 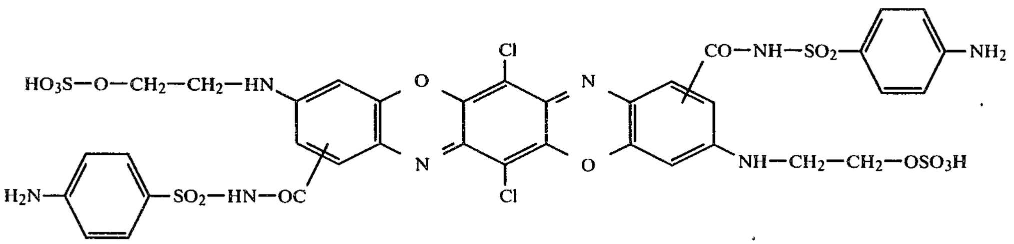 | 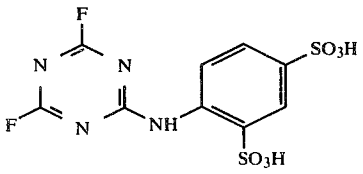 |
| 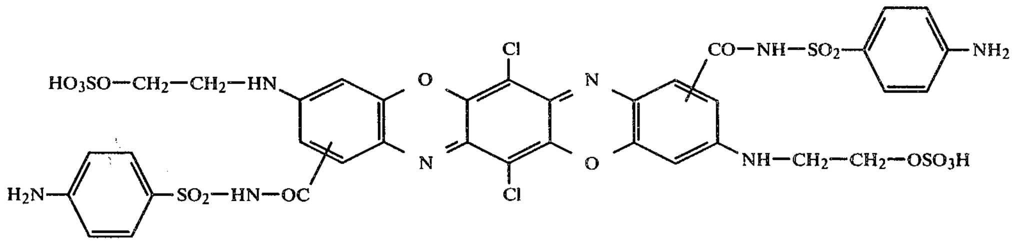 | 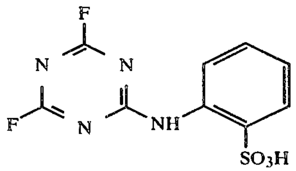 |

-continued
| Dioxazine-carboxamide component | Reactive component |
| --- | --- |
| 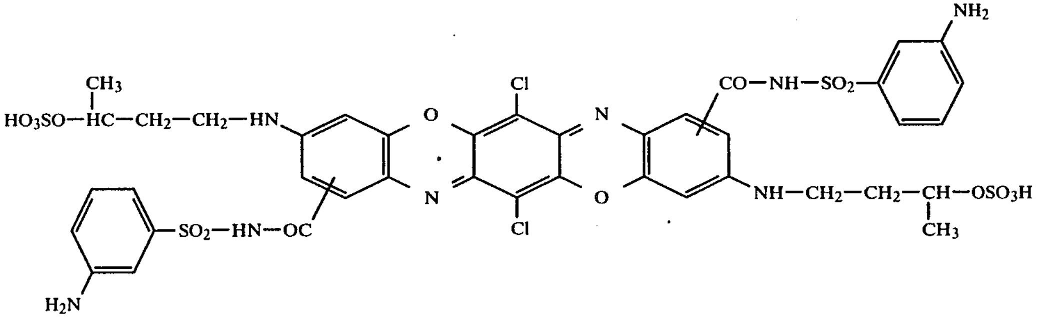 | 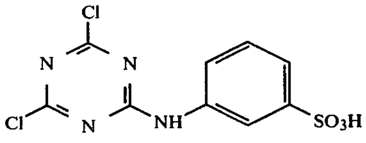 |
| 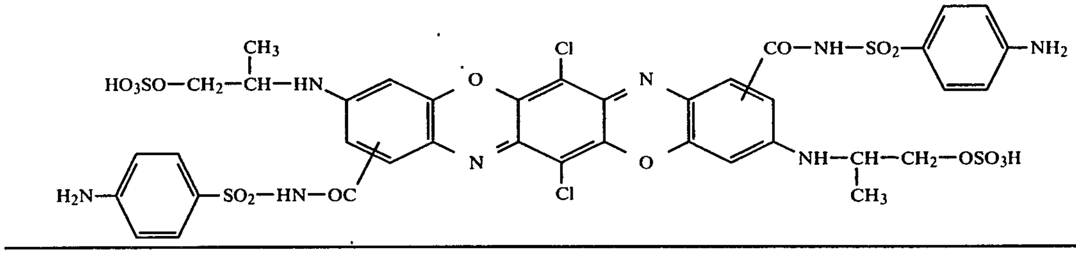 | 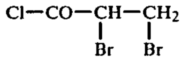 |

We claim:

1. A dyestuff of the formula

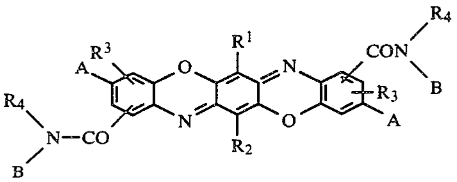

(I)

in which

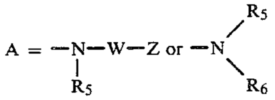

wherein

W=direct bond or

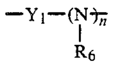

wherein n=0 or 1, $Y_1$=$C_2$–$C_6$-alkylene optionally interrupted by O, S or N or substituted by hydroxy or sulphato, phenyl-$C_1$–$C_2$-alkylene, optionally substituted by $SO_3H$ or $CH_3$, phenylene, optionally substituted by alkyl, alkoxy, sulfo, carboxy or halogen; $R_5$=H; $R_6$=H, $C_1$–$C_6$-alkyl optionally substituted by $SO_3H$, $OSO_3H$, COOH, OH, $C_1$–$C_4$-alkoxy; $C_5$–$C_6$-cycloalkyl, phenyl-$C_1$–$C_4$-alkyl; phenyl or naphthyl optionally substituted by $SO_3H$, COOH, $C_1$–$C_4$-alkyl, halogen, $C_1$–$C_4$-alkoxy; $C_1$–$C_4$-alkylsulfonyl, phenyl-$C_1$–$C_4$-alkylsulfonyl, phenylsulfonyl, naphthylsulfonyl, wherein $R_5$ and $R_6$ together can also denote a $C_4$–$C_5$-alkylene radical which is optionally interrupted by O or N;

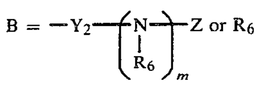

wherein

Z=fibre reactive group $Y_2$=$Y_1$ and if n=1, $SO_2$-phenylene, $R_1$ and $R_2$=H, Cl, Br, $C_1$–$C_4$-alkyl, $C_1$–$C_4$-alkoxy, phenoxy, carboxy, acylamino, $R_3$=H, $C_1$–$C_4$-alkyl, $C_1$–$C_4$-alkoxy, Cl, $R_4$=$R_6$.

2. A dyestuff according to claim 1 which contains at least two sulpho, sulphato or carboxyl groups.

3. A dyestuff according to claim 1 of the formula

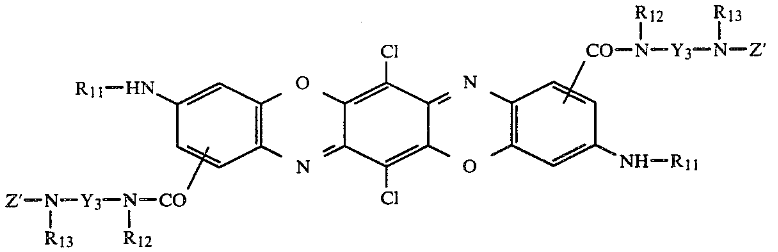

wherein $R_{12}$ and $R_{13}$=H, $C_1$–$C_4$-alkyl or, together, —$CH_2$—$CH_2$—, $R_{11}$=H or $C_1$–$C_6$-alkyl, $Y_3$=$C_2$–$C_6$-alkylene optionally interrupted by O, S or N or substituted by hydroxy or sulphato, cyclohexylene or phenylene optionally substituted by alkyl, alkoxy, sulfo, carboxy or halogen and Z'=a heterocyclic fibre-reactive radical.

4. A dyestuff according to claim 1 of the formula

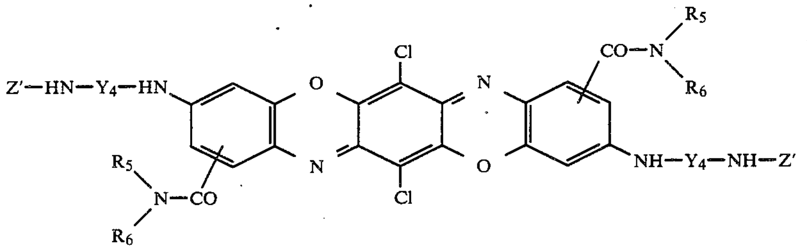

wherein $Y_4$=$C_2$–$C_6$-alkylene or cyclohexylene and

Z'=a heterocyclic fibre-reactive radical.

5. A dyestuff according to claim 1 of the formula

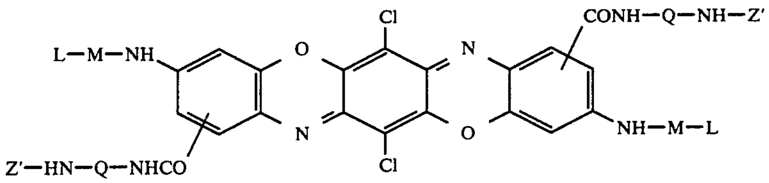

wherein

Z'=a heterocyclic fibre-reactive radical,
L=$SO_3H$, $OSO_3H$, OH or COOH,
M=$C_1$-$C_6$-alkylene and
Q=$C_2$-$C_6$-alkylene.

6. A dyestuff according to claim 1 of the formula

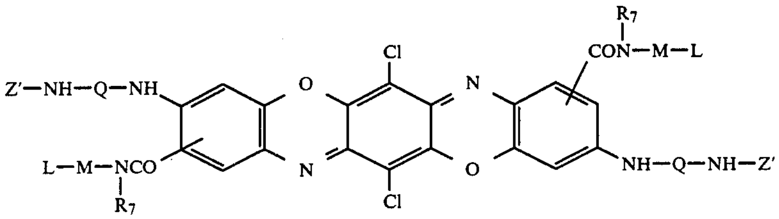

wherein

Z'=a heterocyclic fibre-reactive radical
L=$SO_3H$, $OSO_3H$, OH or COOH,
M=$C_1$-$C_6$-alkylene,
Q=$C_2$-$C_6$-alkylene and
$R_7$=H, —$CH_3$, —$CH_2$—$CH_2$—$SO_3H$, —$CH_2$—$CH_2$—$OSO_3H$, —$CH_2$—$CH_2OH$ or —$CH_2$—COOH.

7. A dyestuff according to claim 1 of the formula

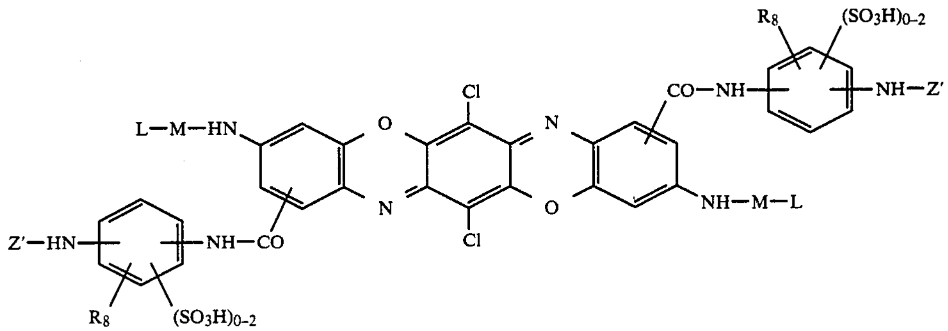

wherein

Z'=a heterocyclic fibre-reactive radical,
L=$SO_3H$, $OSO_3H$, OH or COOH,
M=$C_1$-$C_6$-alkylene and
$R_8$=H, $CH_3$, Cl or $OCH_3$.

8. A dyestuff according to claim 1 of the formula

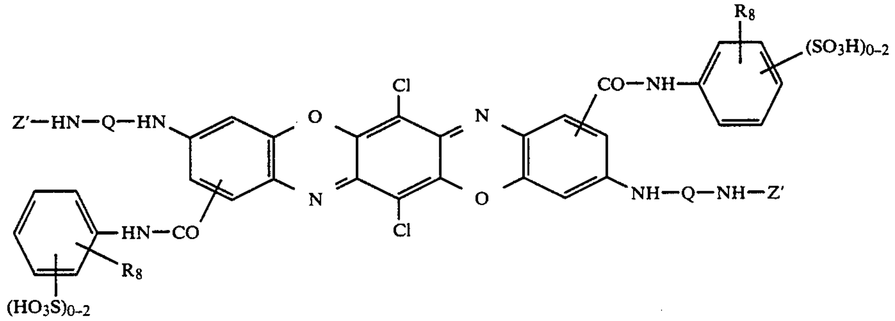

wherein

Z'=a heterocyclic fibre-reactive radical,
Q=$C_2$-$C_6$-alkylene and
$R_8$=H, $CH_3$, Cl or $OCH_3$.

9. A dyestuff according to claim 1 of the formula

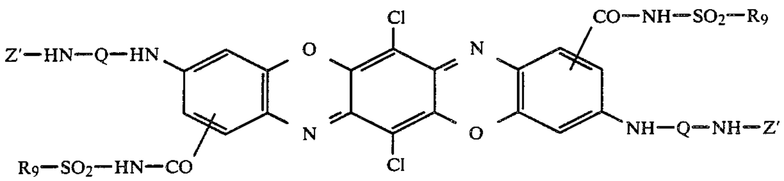

wherein

Z′=a heterocyclic fibre-reactive radical,

Q=$C_2$-$C_6$-alkylene and $R_9$=$C_1$-$C_4$-alkyl, phenyl or tolyl.

10. A dyestuff according to claim 1 of the formula

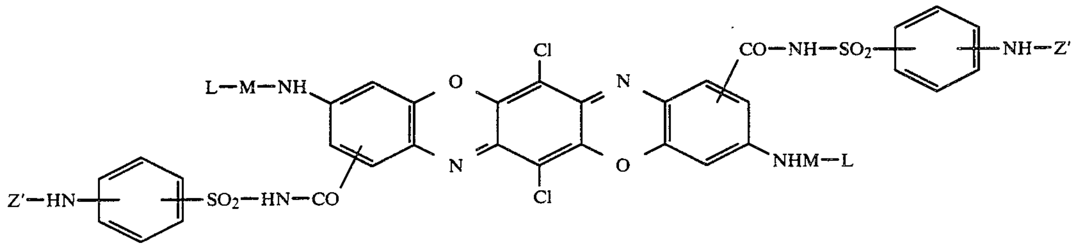

wherein

Z′=a heterocyclic fibre-reactive radical,

M=$C_1$-$C_6$-alkylene and

L=$SO_3H$, $OSO_3H$, OH or COOH.

11. A dyestuff which is free from reactive groups, of the formula

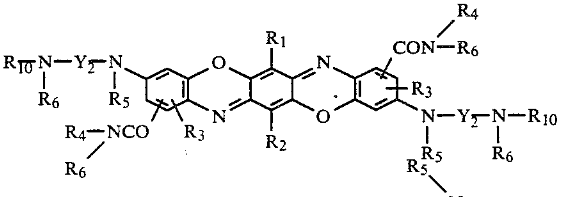

wherein $R_{10}$=H or the radical of a sulphonic acid or carboxylic acid which is free from reactive groups and $R_1$-$R_6$ and $Y_2$ have the meaning given in claim 1.

12. A dyestuff which is free from reactive groups, of the formula

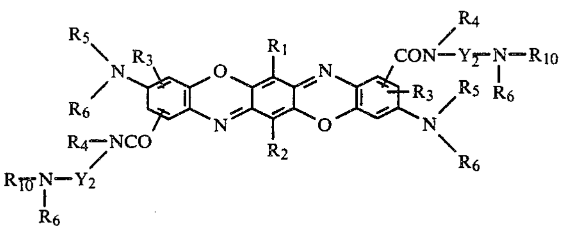

or of the formula

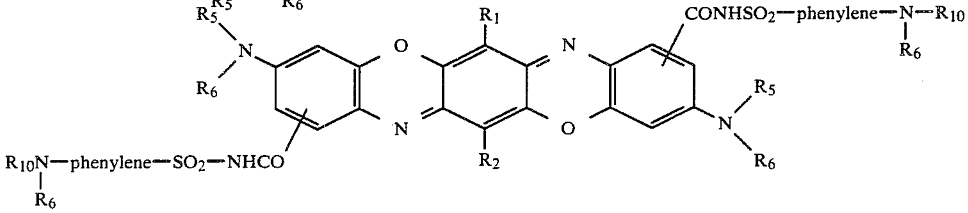

wherein $R_1$-$R_6$ and $Y_2$ have the meaning given in claim 1 and $R_{10}$=H or the radical of a sulphonic acid or carboxylic acid which is free from reactive groups.

* * * * *

UNITED STATES PATENT AND TRADEMARK OFFICE

CERTIFICATE OF CORRECTION

PATENT NO. : 4,622,396

DATED : November 11, 1986

INVENTOR(S) : Wolfgang Harms, et al.

It is certified that error appears in the above-identified patent and that said Letters Patent is hereby corrected as shown below:

| | |
|---|---|
| Col. 1, line 39 | Delete "n+O" and substitute --n=O-- |
| Col. 1, line 57 | Delete "ad" and substitute --and-- |
| Col. 4, line 31 | Delete "of" before "fibre" |
| Col. 4, line 34 | Delete "from" and substitute --form-- |
| Col. 5, lines 8-9 | Delete "hydroxy" and substitute --oxy-- |
| Col. 5, line 24 | Delete "$C_{14}$" and substitute--$C_4$-- |
| Col. 55, formula 1 | Beginning of formula delete "$HO_3S$" and substitute --$HO_3SO$-- |
| Col. 11, line 37 | Insert -- - -- after "$C_4$" |
| Col. 17, line 58 | Insert -- - -- before (substituted" |
| Col. 19, line 18 | Insert --of-- before "2" |
| Col. 61, line 41 | Delete "2" and substitute --2'-- |
| Col. 62, line 63 | Delete "3" and substitute --3'-- |

Signed and Sealed this

Twenty-eighth Day of April, 1987

*Attest:*

DONALD J. QUIGG

*Attesting Officer*

*Commissioner of Patents and Trademarks*